(12) United States Patent
Mizuno

(10) Patent No.: US 8,867,097 B2
(45) Date of Patent: Oct. 21, 2014

(54) IMAGE PROCESSING APPARATUS AND METHOD FOR CORRECTING IMAGE DISTORTION USING CORRECTION VALUE

(71) Applicant: Canon Kabushiki Kaisha, Tokyo (JP)

(72) Inventor: Yoshitake Mizuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/711,522

(22) Filed: Dec. 11, 2012

(65) Prior Publication Data

US 2013/0155428 A1 Jun. 20, 2013

(30) Foreign Application Priority Data

Dec. 15, 2011 (JP) ................. 2011-274886

(51) Int. Cl.
| | |
|---|---|
| *H04N 1/60* | (2006.01) |
| *H04N 1/047* | (2006.01) |
| *G03G 15/00* | (2006.01) |
| *B41J 11/00* | (2006.01) |
| *G06K 15/02* | (2006.01) |
| *H04N 1/12* | (2006.01) |

(52) U.S. Cl.
CPC ............... *G06K 15/02* (2013.01); *H04N 1/047* (2013.01); *H04N 2201/0082* (2013.01); *H04N 2201/0471* (2013.01); *H04N 2201/04787* (2013.01); *G03G 2215/00569* (2013.01); *G03G 15/5062* (2013.01); *B41J 11/008* (2013.01); *H04N 1/12* (2013.01); *G03G 2215/0059* (2013.01)
USPC ................. 358/1.9; 358/1.2; 358/504; 347/19

(58) Field of Classification Search
None
See application file for complete search history.

(56) References Cited

U.S. PATENT DOCUMENTS

| | | | | |
|---|---|---|---|---|
| 6,024,504 | A * | 2/2000 | Weichmann et al. ........... | 400/61 |
| 6,490,421 | B2 * | 12/2002 | McIntyre ........................ | 399/15 |
| 6,637,327 | B2 * | 10/2003 | Endo et al. .................... | 101/181 |
| 7,548,326 | B2 * | 6/2009 | Fukushima .................. | 358/1.12 |
| 7,804,623 | B2 * | 9/2010 | Gerrits et al. ................ | 358/3.26 |
| 7,866,664 | B2 * | 1/2011 | Kao .............................. | 271/227 |
| 7,916,346 | B2 * | 3/2011 | Matsuzaki et al. ............ | 358/1.9 |
| 8,553,280 | B2 * | 10/2013 | Hoover et al. ................. | 358/1.9 |
| 2003/0133000 | A1 * | 7/2003 | Conrow et al. ............... | 347/116 |
| 2004/0086288 | A1 * | 5/2004 | Wibbels ........................ | 399/45 |
| 2008/0218811 | A1 * | 9/2008 | Yeo ............................... | 358/461 |
| 2011/0102817 | A1 * | 5/2011 | Hoover et al. ................. | 358/1.9 |

FOREIGN PATENT DOCUMENTS

| | | |
|---|---|---|
| JP | 2006-276427 A | 10/2006 |
| JP | 2011-43533 A | 3/2011 |

* cited by examiner

*Primary Examiner* — Dung Tran
(74) *Attorney, Agent, or Firm* — Canon U.S.A., Inc. IP Division

(57) ABSTRACT

An image processing apparatus includes a forming unit configured to form, on a sheet, a pattern from which at least two lines each connecting two points located at positions parallel to a conveyance direction of the sheet are detectable, a detection unit configured to detect, from the pattern formed by the forming unit, at least two lengths of lines each connecting two points located at positions parallel to the conveyance direction, and an acquisition unit configured to acquire a correction value used when correction is performed so that there is no difference between the lengths of a plurality of lines detected by the detection unit. The forming unit forms an image obtained by correcting a corrected image to be output using the correction value acquired by the acquisition unit.

15 Claims, 29 Drawing Sheets

IMAGE PROCESSING APPARATUS AND METHOD FOR CORRECTING IMAGE DISTORTION USING CORRECTION VALUE

BACKGROUND OF THE INVENTION

1. Field of the Invention

The present invention relates to an image processing apparatus that corrects distortion of an image formed on a sheet.

2. Description of the Related Art

Machines capable of realizing image quality similar to that of printing machines have appeared with an improvement of the capability of electro-photographic apparatuses. However, in printing of such electro-photographic apparatuses, misalignment of a printing position of image data formed on a sheet may occur and distortion of the image data printed on a sheet may occur.

To resolve, among several kinds of misalignment of a printing position, misalignment occurring to the front, rear, right, and left sides in a conveyance direction in an image forming apparatus with respect to a printing position of an image printed on the front surface of a sheet and a printing position of an image printed on the rear surface of the sheet, the following method has been discussed.

First, an intermediate transfer member or a sheet on which a pattern is printed is read by an image forming apparatus. Then, misalignment occurring at a printing position is automatically adjusted based on the read result (see Japanese Patent Application Laid-Open No. 2006-276427).

In an image forming apparatus that forms an image on one sheet by repeating a process for transferring and fixing a toner image formed on an intermediate transfer member onto the sheet a plurality of times, the sheet may be irregularly deformed due to the fixing performed the plurality of times in some cases.

Specifically, the lengths of the sides perpendicular to a sheet conveyance direction among the sides of a sheet may irregularly expand or contract. For example, when the sheet conveyance direction is assumed to be the front, the front edge of the sheet contracts more than the rear edge of the sheet, and thus the sheet is deformed in a trapezoidal shape. When the sheet is irregularly deformed at the time of fixing the previous toner image in association with the distortion of the sheet, a toner image with an irregularly deformed shape is used at the time of fixing the subsequent toner image.

A technology for performing printing by a toner image with a shape deformed based on deformation of a sheet has been discussed in Japanese Patent Application Laid-Open No. 2011-43533. However, a technology has not been discussed as to a case where contraction of the length of a side formed in a conveyance direction by a position perpendicular to the conveyance direction among the sides of an image formed on a sheet (hereinafter, referred to as trapezoidal distortion) is automatically corrected.

SUMMARY OF THE INVENTION

The present invention is directed to a method for correcting trapezoidal distortion and outputting an image where the trapezoidal distortion is corrected according to a way in which the load on a user is reduced.

According to an aspect of the present invention, there is provided an image processing apparatus including a forming unit configured to form, on a sheet, a pattern from which at least two lines each connecting two points located at positions parallel to a conveyance direction of the sheet are detectable, a detection unit configured to detect, from the pattern formed by the forming unit, at least two lengths of lines each connecting two points located at positions parallel to the conveyance direction, and an acquisition unit configured to acquire a correction value used when correction is performed so that there is no difference between the lengths of a plurality of lines detected by the detection unit. The forming unit forms a corrected image obtained by correcting an image to be output using the correction value acquired by the acquisition unit.

According to the way with the load on the user reduced, a distortion amount for the trapezoidal distortion occurring in printing of an image can be measured. Then, the trapezoidal distortion occurring for an image to be output can be corrected using the measured distortion amount, and thus it is possible to realize corrected image forming with high equality for which distortion is suppressed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment of the present invention will be described.

Figure 1:
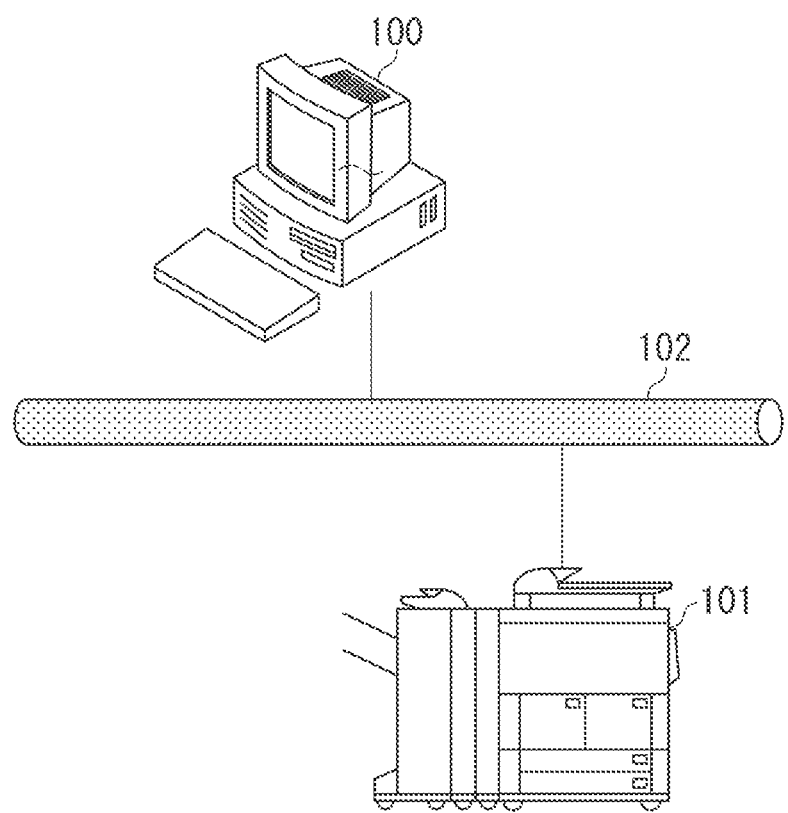
FIG. 1 illustrates an image forming system according to an exemplary embodiment of the present invention.

FIG. 1 is a diagram illustrating an example of an entire configuration of an image forming system according to the exemplary embodiment.

An information processing apparatus 100 and an image forming apparatus 101 are connected to a local area network (LAN) 102 to be communicable. The image forming apparatus 101 may be a multi-function peripheral (MFP) or a signal function peripheral (SFP).

Figure 3:
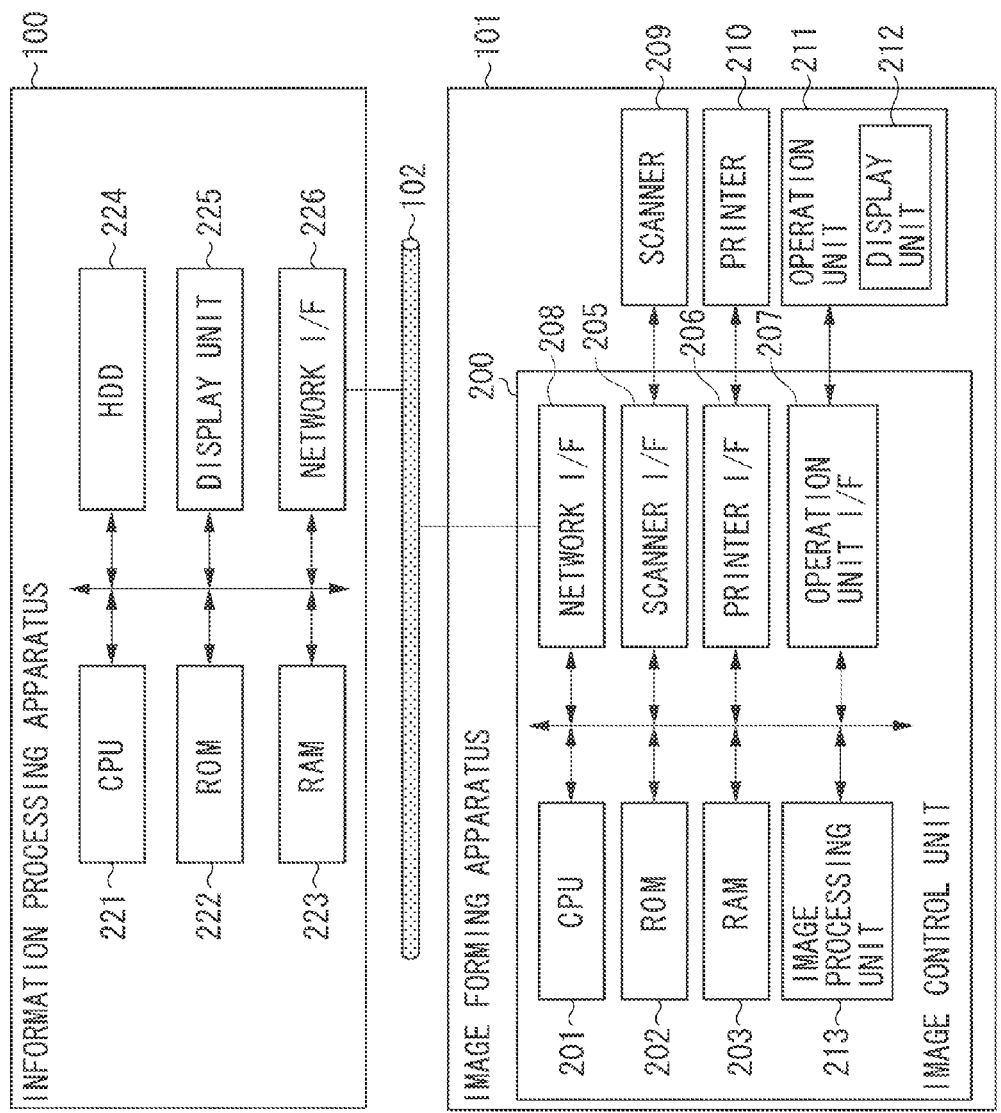
FIG. 3 is a block diagram illustrating the image forming apparatus and an information processing apparatus.

FIG. 3 is a block diagram illustrating configurations of the image forming apparatus 101 and the information processing apparatus 100.

The image forming apparatus 101 includes an image control unit 200, a scanner 209, a printer 210, and an operation unit 211. The image control unit 200 controls the scanner 209, the printer 210, and the operation unit 211.

A central processing unit (CPU) 201 of the image control unit 200 reads a control program stored in a read-only memory (ROM) 202 and performs various control processing such as printing control. A random access memory (RAM) 203 is used as a main memory of the CPU 201 and a partial storage region such as a work area.

A scanner I/F 205 connects the scanner 209 to the image control unit 200. Image data of a document read by the scanner 209 is transmitted to the image control unit 200 via the scanner I/F 205 and is used for the purposes of printing, storage, transfer, or the like.

A printer I/F 206 connects the printer 210 to the image control unit 200. The image data to be printed by the printer 210 is transmitted from the image control unit 200 to the printer 210 via the printer I/F 206 and is printed on a sheet by the printer 210.

An operation I/F 207 connects the operation unit 211 to the image control unit 200. Various operation units such as an operation unit configured only by a switch or a light-emitting diode (LED), or an operation unit including a touch panel type LCD display unit can be used as the operation unit 211. Information input with the operation unit 211, which can be transmitted to the CPU 201 via the operation unit I/F 207, is subjected to desired processing, and is displayed on a display unit 212 included in the operation unit 211 according to the desired processing.

A network I/F 208 connects the image control unit 200 to the LAN 102. The network I/F 208 transmits image data or information to the information processing apparatus 100 on the LAN 102 or conversely receives print data or various kinds of information from the information processing apparatus 100 on the LAN 102.

The information processing apparatus 100 includes a CPU 221, a ROM 222, a RAM 223, a hard disk drive (HDD) 224, a display unit 225, and a network I/F 226.

The CPU 221 of the information processing apparatus 100 reads a control program stored in the ROM 222 and performs control of an application operating on the information processing apparatus 100 or generation of printing data to be transmitted to the image forming apparatus 101. The RAM 223 is used as a main memory of the CPU 221 and a partial storage region such as a work area.

Various applications, a printer driver or the like configured to generate image data to be transmitted to the image forming apparatus 101 is installed in the HDD 224. The HDD 224 stores image data transmitted from the image forming apparatus 101.

The display unit 225 displays an application operated by the information processing apparatus 100. The display unit 225 is integrated with the information processing apparatus 100, if the information processing apparatus 100 is a laptop PC. The display unit 225 is connected to the information processing apparatus 100 as a separate physical device, for example, a monitor display, if the information processing apparatus 100 is a desktop PC.

The network I/F 226 connects the information processing apparatus 100 to the LAN 102 and is functionally similar to the network I/F 208.

An image processing unit 213 performs image processing such as enlargement, reduction, color conversion processing, or halftone processing on the image data to be printed by the printer 210, before the image data is transmitted from the image control unit 200 to the printer 210 via the printer I/F 206. The image processing unit 213 adjusts misalignment of a position of an image and correction distortion of the image for a sheet based on a distortion correction value set for a front surface and/or a rear surface of the sheet. Application Specific Integrated Circuits (ASIC), a Field Programmable Gate Array (FPGA), a CPU, or the like can be considered to be used as the image processing unit 213.

Figure 2:
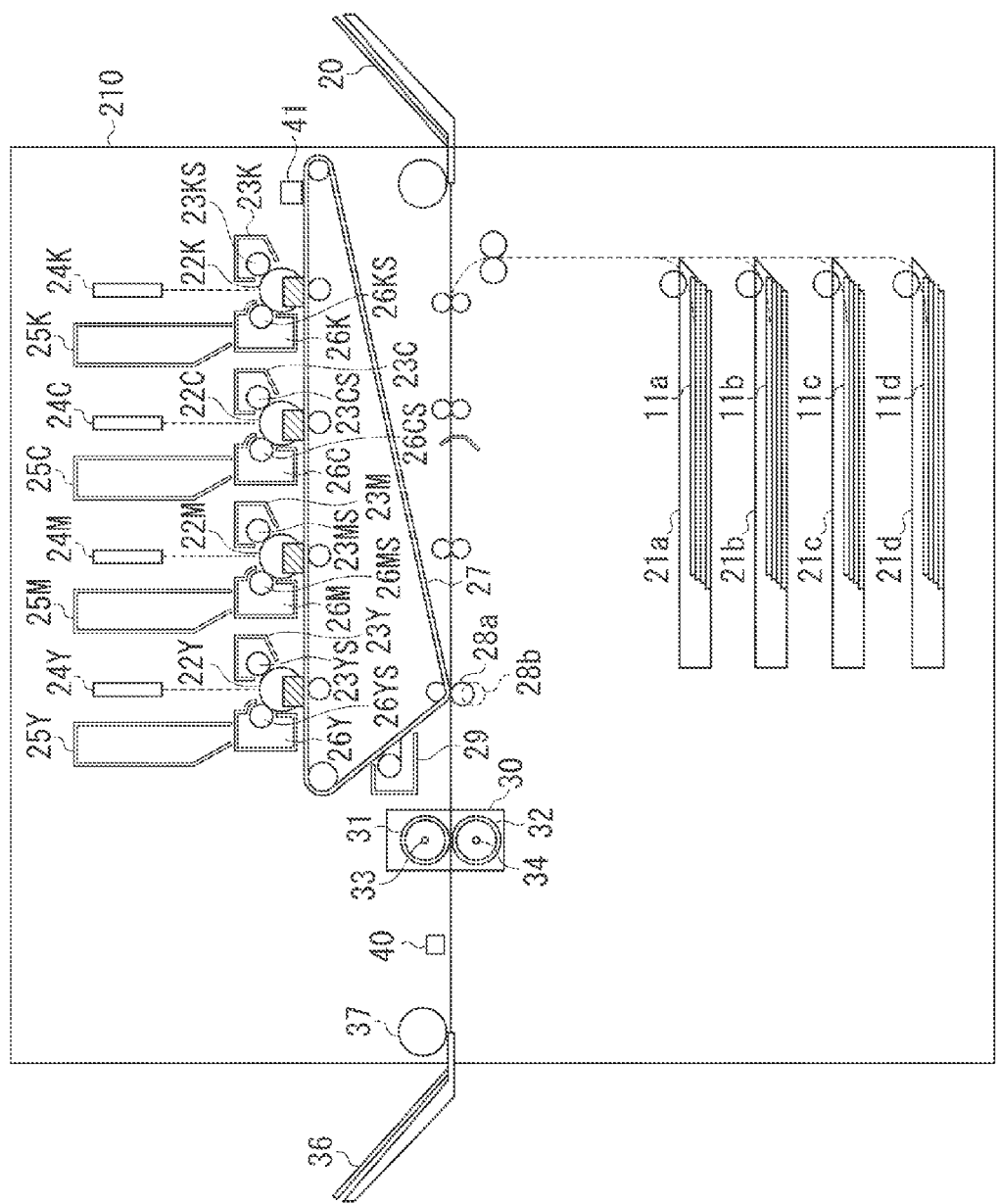
FIG. 2 is a sectional view of an image forming apparatus according to the exemplary embodiment of the present invention.

An operation of the printer 210 in the electro-photographic type image forming apparatus 101 will be described with reference to FIG. 2.

The printer 210 forms an electrostatic latent image using exposure light which turns on or off based on an exposure time calculated by the image control unit 200 and forms a monochromatic toner image by developing the electrostatic latent image. Then, the printer 210 forms a multi-color toner image by superimposing the monochromatic toner images, transfers the multi-color toner image to sheets 11a to 11d, and fixes the multi-color toner image onto the sheets 11a to 11d.

The printer 210 includes a sheet feeding unit, photosensitive members 22Y to 22K, injection charging devices 23Y and 23K, toner cartridges 25Y to 25K, development devices 26Y to 26K, an intermediate transfer member 27, a transfer roller 28, a cleaning unit 29, and a fixing unit 30.

The sheet feeding unit includes a plurality of sheet feed trays 21a to 21d and a manual sheet feed stage 20. Sheets 11a to 11d are stacked on the sheet feed trays 21a to 21d. Various sheets, such as sheets with different sizes, backing sheets (reuse sheets), and unused sheets (blank sheets), can be stacked as the sheets 11a to 11d.

The photosensitive drums (photosensitive members) 22Y to 22K are configured by applying an organic photoconductive layer to an outer circumference of an aluminum cylinder, and are rotated by delivering a driving force of a driving motor (not illustrated). The driving motor rotates the photosensitive drums 22Y to 22Y in a counterclockwise direction according to image forming processing.

Four injection charging devices 23Y to 23K are configured, as primary charging units, to charge the yellow (Y), magenta (M), cyan (C), and black (K) photosensitive devices for respective stations, and sleeves 23YS to 23KS are provided in the respective injection charging devices.

By transmitting exposure light from scanner units 24Y to 24K to the photosensitive drums 22Y to 22K and selectively exposing the surfaces of the photosensitive drums 22Y to 22K, an electrostatic latent image is formed.

As development units, four yellow (Y), magenta (M), cyan (C), and black (K) development devices 26Y to 26K performing development are configured for the respective stations, to visualize the electrostatic latent image. The sleeves 26YS to 26KS are installed in the respective development devices. Each development device is detachably mounted.

The intermediate transfer member 27, which comes into contact with the photosensitive drums 22Y to 22K, is rotated in the clockwise direction at the time of forming an image and is rotated with the rotation of the photosensitive drums 22Y to 22K, so that monochromatic toner images are transferred. Thereafter, the transfer roller 28 (to be described below) comes into contact with the intermediate transfer member 27, the sheets 11a to 11d are conveyed in a pinched manner, and the multi-color toner image on the intermediate transfer member 27 is transferred to the sheets 11a to 11d.

The transfer roller 28 comes into contact with the sheets 11a to 11d at a position 28a during the transfer of the multi-color toner image to the sheets 11a to 11d and is separated at a position 28b after the printing processing. The sheet on which the toner image has been transferred is conveyed up to the fixing unit 30.

The fixing unit 30 melts and fixes the transferred multi-color toner image, while conveying the sheets 11a to 11d. The fixing unit 30 includes a fixing roller 31 to heat the sheets 11a to 11d and a pressure roller 32 to press and bring the sheets 11a to 11d into contact with the fixing roller 31. The fixing roller 31 and the pressure roller 32 are formed in a hollow state and have heaters 33 and 34 therein, respectively. That is, the sheets 11a to 11d on which the multi-color toner image is held are conveyed by the fixing roller 31 and the pressure roller 32, and the toner is fixed onto the surface of each sheet by applying heat and pressure.

After the toner image has been fixed, the sheets 11a to 11d are discharged to a discharge tray 36 by a discharge roller 37, and thus an image forming operation ends.

The cleaning unit 29 cleans the toner remaining on the intermediate transfer member 27. Waste toner, which is the toner remaining after the multi-color toner image of four colors formed on the intermediate transfer member 27 is transferred to the sheets 11a to 11d, is stored in a cleaner container included in the cleaning unit 29.

An edge detection unit 40 is installed in a sheet conveyance path between the fixing unit 30 and the discharge roller 37. The edge detection unit 40 detects ends of the sheets 11a to 11d and an edge of a pattern formed as an image on the sheets 11a to 11d, for example, based on detection signals from a light-emitting element and a photoelectric conversion sensor. The edge detection unit 40 can also use a line sensor mounted on a flat head scanner.

Figure 4:
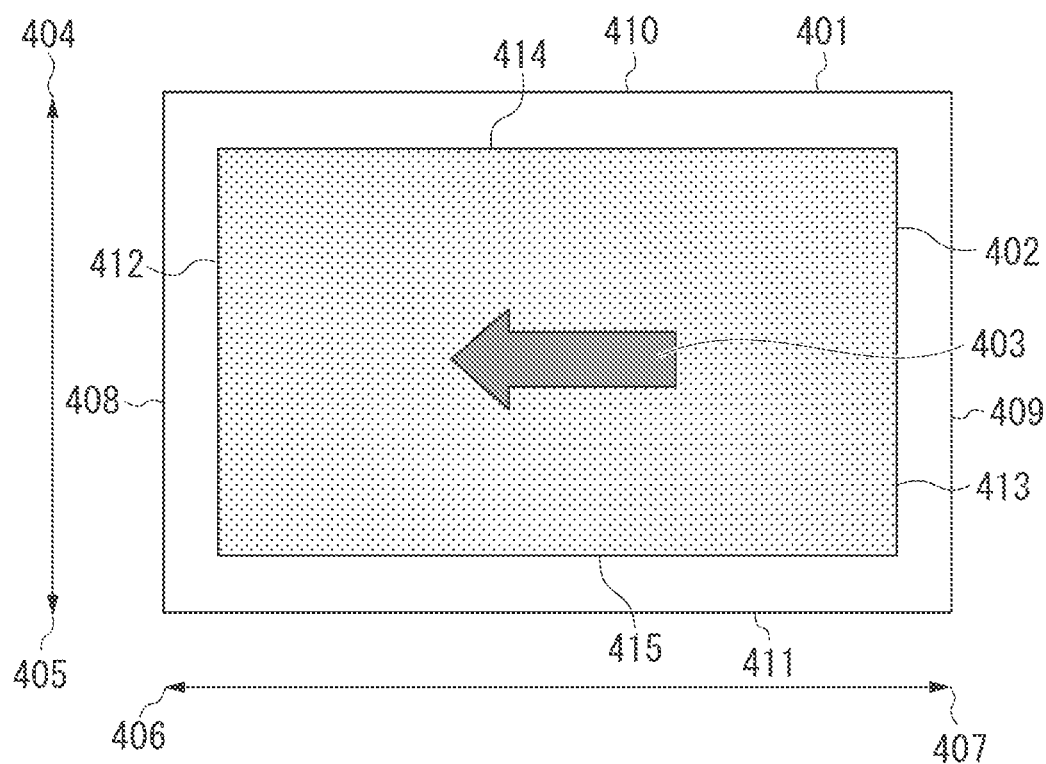
FIG. 4 illustrates a sheet and a pattern formed on the sheet.

Hereinafter, distortion and misalignment occurring at the time of forming an image will be described with reference to FIGS. 4 to 7. FIG. 4 is an image diagram illustrating a sheet and the pattern formed as an image on the sheet.

When a rectangular pattern 402 is formed as an image on a sheet 401 and a sheet conveyance direction in the apparatus is assumed to be an arrow 403, a direction indicated by arrows 404 and 405 is referred to as a main-scanning direction, the arrow 404 is referred to as a main-scanning rear end, and the arrow 405 is referred to as a main-scanning front end. Further, a direction indicated by arrows 406 and 407 is referred to as a sub-scanning direction, the arrow 406 is referred to as a sub-scanning front end, and the arrow 407 is referred to as a sub-scanning rear end.

With regard to the sides in the main-scanning direction among the sides surrounding the sheet, a side 408 on the front side in the conveyance direction is referred to as a "sheet sub-scanning front end side" and a side 409 on the rear side in the conveyance direction is referred to as a "sheet sub-scanning rear end side."

Further, with regard to the sides in the sub-scanning direction among the sides surrounding the sheet, a side 410 in the main-scanning rear end direction is referred to as a "sheet main-scanning rear end side and aside 411 in the main-scanning front end direction is referred to as a "sheet main-scanning front end side."

Likewise, with regard to the sides in the main-scanning direction among the sides of an image formed on the sheet, a side 412 formed in the sub-scanning front end direction is referred to as an "image sub-scanning front end side" and a side 413 formed in the sub-scanning rear end direction is referred to as an "image sub-scanning rear end side."

Furthermore, with regard to the sides in the sub-scanning direction among the sides of the image formed on the sheet, a side 414 formed in the main-scanning rear end direction is referred to as an "image main-scanning rear end side" and a side 415 formed in the main-scanning front end direction is referred to as an "image main-scanning front end side."

Figure 5:
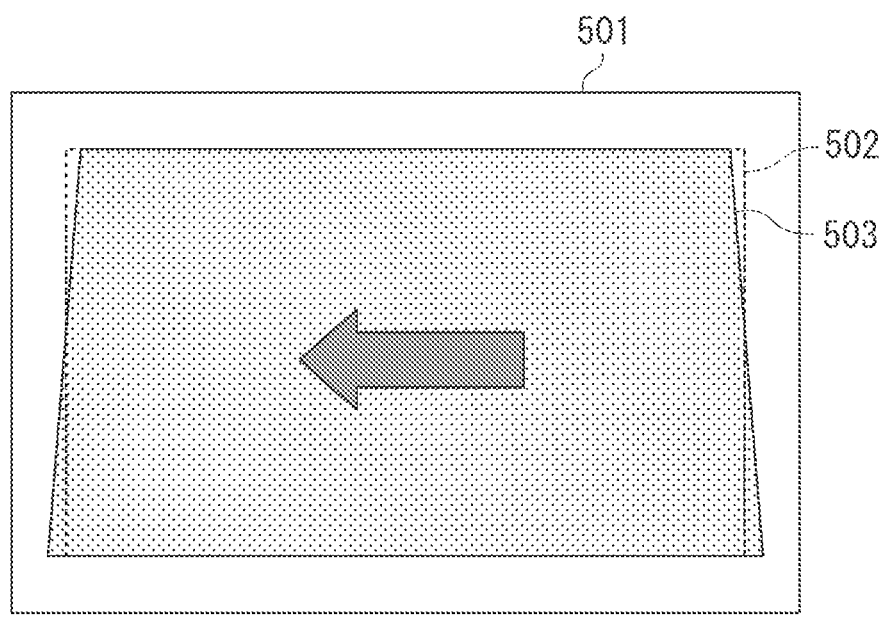
FIG. 5 illustrates trapezoidal distortion occurring in a pattern formed on a sheet.

FIG. 5 is an image diagram illustrating a sheet and trapezoidal distortion occurring in a pattern formed on the sheet according to the exemplary embodiment.

When a rectangular pattern 502 is formed on a sheet 501, the length of a side is changed in a direction oriented from the image main-scanning front end side to the image sub-scanning rear end side due to an outer diameter difference in the rear and front direction which is a direction perpendicular to the conveyance direction of the intermediate transfer member 27. Therefore, the rectangular pattern 402 expected to be formed, as illustrated in FIG. 4, may be distorted in a trapezoidal shape 503. Hereinafter, this distortion is referred to as trapezoidal distortion.

Figure 6:
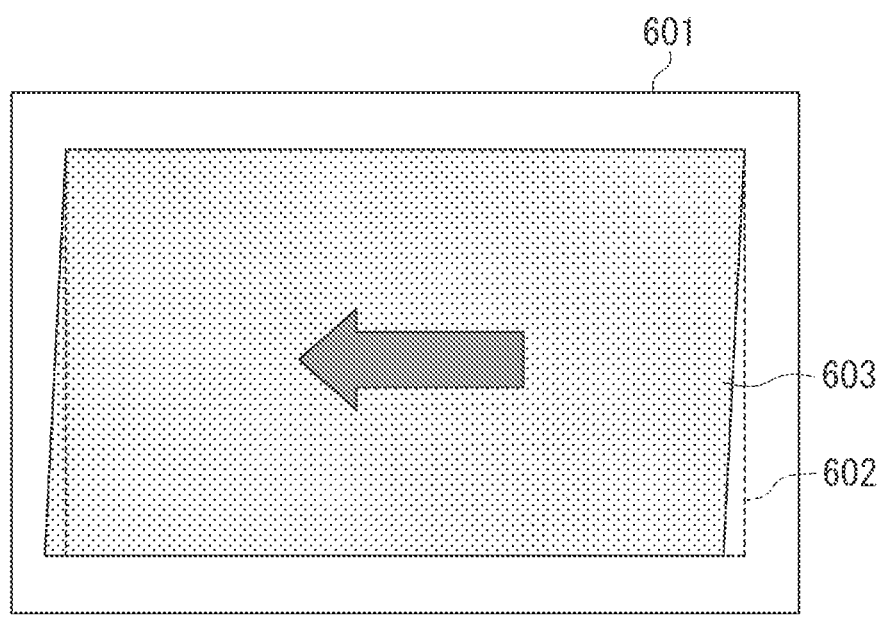
FIG. 6 illustrates skew distortion occurring in a pattern formed on a sheet.

FIG. 6 is an image diagram illustrating a sheet and skew distortion occurring in a pattern formed on the sheet.

When a rectangular pattern 602 indicated by a dotted line is formed on a sheet 601, the image forming positions at the main-scanning front and rear ends may be misaligned in some cases due to the influence of alignment or the like of the intermediate transfer member 27 and the photosensitive drums (photosensitive members) 22Y to 22K. That is, the image sub-scanning front end side and the image sub-scanning rear end side is biased with respect to the sheet sub-scanning front end side and the sheet sub-scanning rear end side, respectively. Hereinafter, this distortion is referred to as skew distortion.

Figure 7:
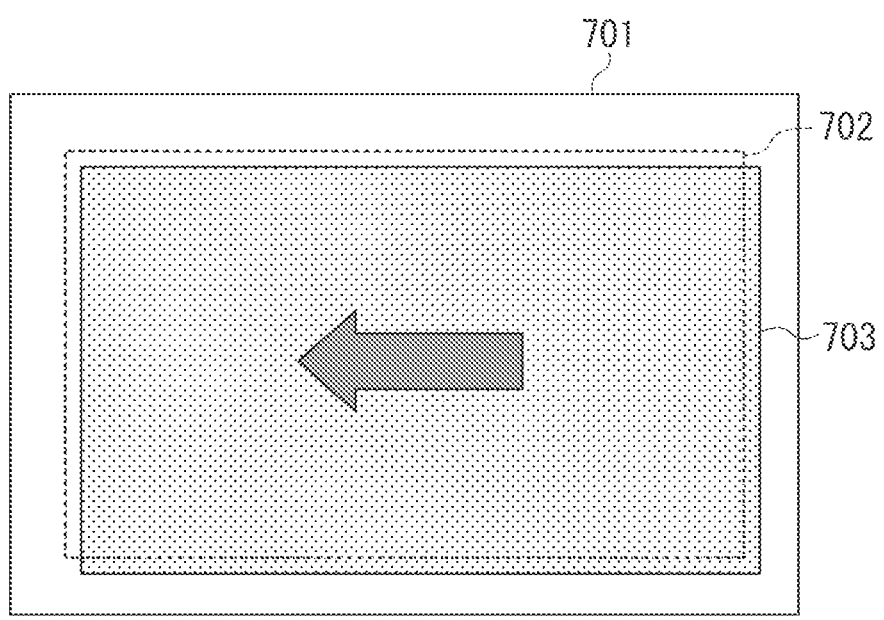
FIG. 7 illustrates image forming position misalignment occurring in a pattern formed on a sheet.

FIG. 7 is an image diagram illustrating a sheet and image forming position misalignment occurring in a pattern formed on the sheet.

When a rectangular pattern 702 is formed as an image on a sheet 701, an image forming position may be misaligned in the main-scanning direction and the sub-scanning direction with respect to an image forming expectation position in some cases. Hereinafter, the image position misalignment is referred to as an image forming position misalignment.

Figure 8:
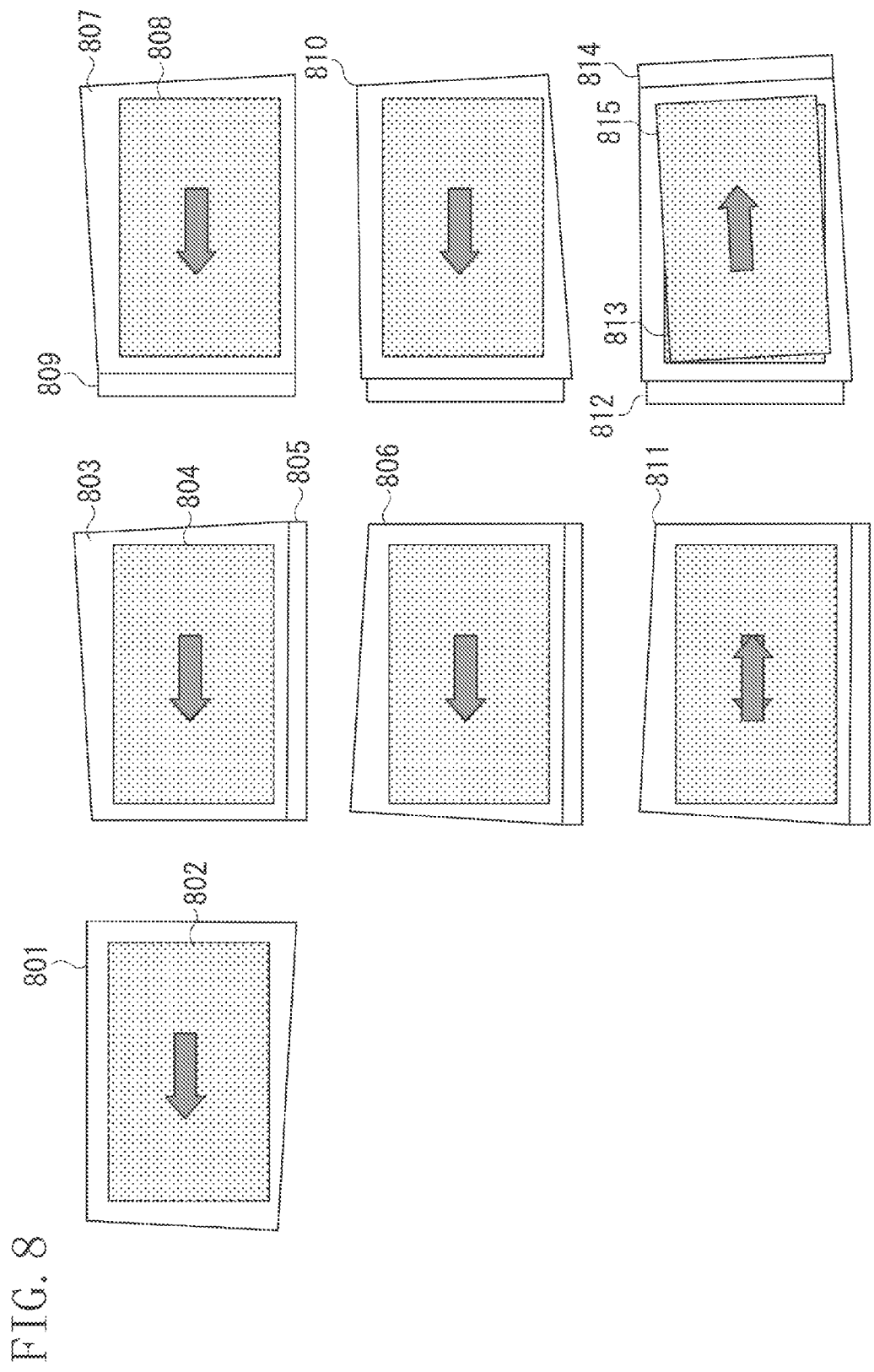
FIG. 8 illustrates bias distortion occurring in a pattern formed on various sheets.

FIG. 8 illustrates image diagrams respectively illustrating a sheet and bias distortion occurring in a pattern formed on the sheet.

A sheet 801 may not have an exact rectangular shape, but the sheet 801 may be distorted slightly before printing in some cases, as illustrated in the sheet 801. Here, when the printer 210 performs image forming on the sheet 801 without correction, a pattern 802 is formed as an image on the sheet 801, as illustrated. The printer 210 forms the pattern as an image by adjusting a specific one side among the sides of the sheet so that the angle is surly identical at the time of conveying the sheet.

For example, the sheets being conveyed come into contact with a given member and the positions of the sheets used in printing are aligned. The processing is referred to as bias elimination. Therefore, for example, when bias elimination 805 is performed at the main-scanning front end, the printer 210 changes the angle of the sheet 803 by the bias elimination 805 and forms a pattern 804 as an image.

Here, when the printer 210 forms the pattern as an image on a rear surface 806 of the sheet 803, the bias is eliminated at the main-scanning front end on any of the front and the rear surfaces of the sheet. As illustrated in a sheet 811, the pattern can be formed as an image without misalignment on the front and the rear surfaces.

When the bias elimination 805 may not be performed at the main-scanning front end due to a cause such as an inner space of the image forming apparatus 101, bias elimination 809 is performed at the sub-scanning front end in some cases, as illustrated.

In this case, the printer 210 forms a pattern 808 as an image on the front surface of a sheet 807 and also forms the pattern 808 as an image on a rear surface 810 of the sheet 807. Then, a pattern 815 of the front surface is formed as an image by performing bias elimination in the direction of 814. Further, a pattern 813 of the rear surface is formed as an image by performing bias elimination in the direction of 812. Then, misalignment occurs at the positions of the patterns formed on the front and the rear surfaces of the sheet. Hereinafter, this misalignment is referred to as bias distortion.

Figure 9A:
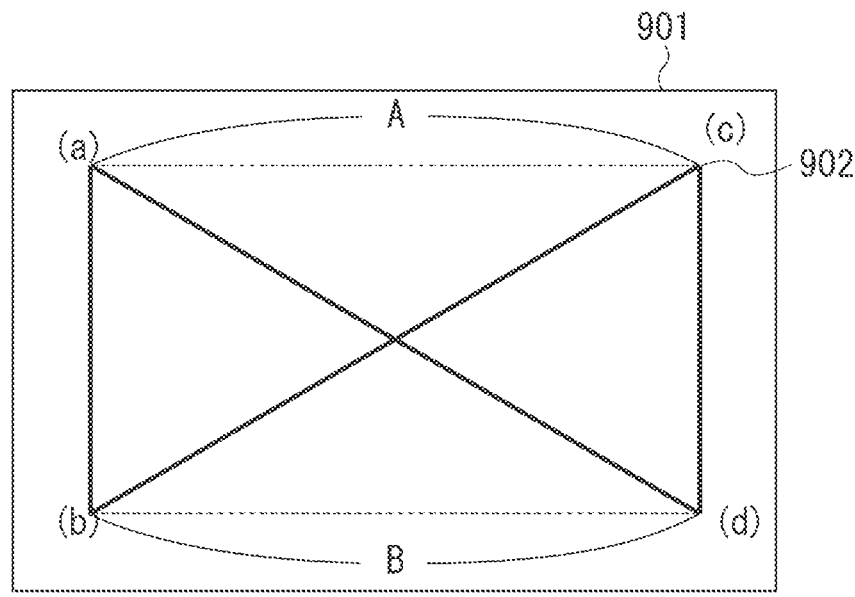
FIGS. 9A and 9B each illustrate a measurement pattern formed on a sheet.
Figure 9B:
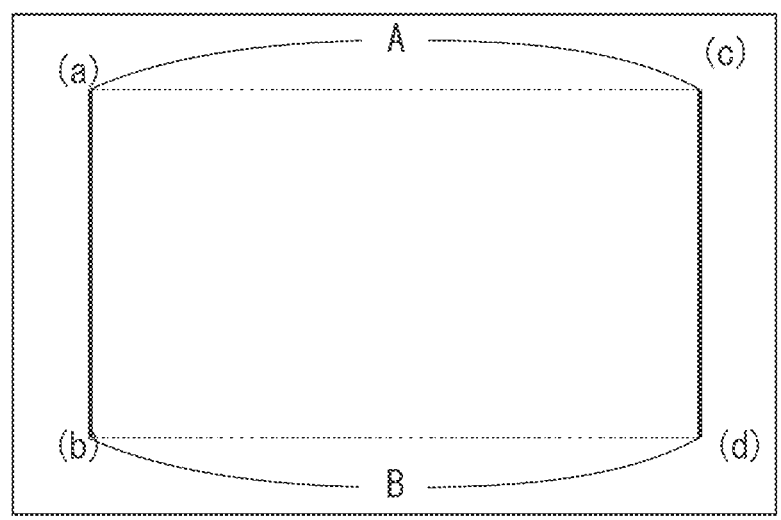

FIGS. 9A and 9B are image diagrams respectively illustrating a sheet and a measurement pattern formed on the sheet. In the exemplary embodiment, a pattern in which vertexes 902 of a rectangle are connected on a sheet 901 will be described.

Figure 10:
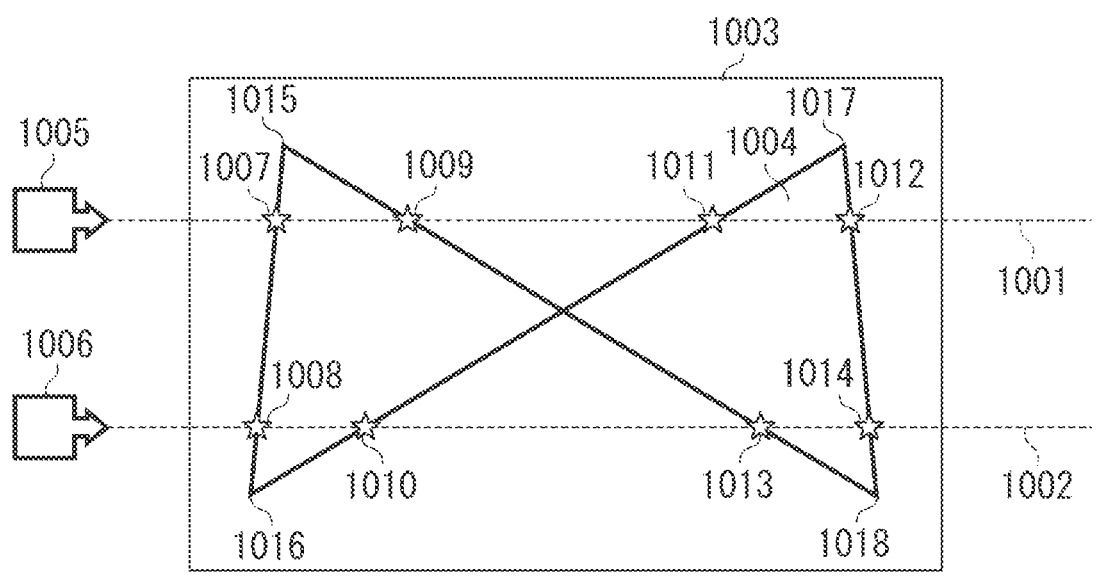
FIG. 10 illustrates a method for measuring an amount of the trapezoidal distortion.

A pattern illustrated in FIG. 9A is a pattern formed by connecting four points (a), (b), (c), and (d) to each other. A distance from the line connecting the points (a) and (b), which is detected by the sensors illustrated in FIG. 10, to the line connecting the points (c) and (d), which is detected by the sensors illustrated in FIG. 10, is measured. The distance is the width of a line segment A connecting the points (a) and (c). Further, the distance is the width of a line segment B connecting the points (b) and (d). To measure the line segment A and the line segment B that are parallel in a transportation direction of the sheet, at least, a line connecting the points (a) and (b) and a line connecting the points (c) and (d) may be detected by the sensors illustrated in FIG. 10, both of the lines intersecting the transportation direction of the sheet, respectively. In the exemplary embodiment, a pattern illustrated in FIG. 9A is used. This pattern is formed of the line connecting the points (a) and (b), the line connecting the points (c) and (d), the line connecting the points (a) and (d), and the line connecting the points (b) and (c). The line connecting the points (a) and (d) intersects the line connecting the points (b) and (c).

The measurement pattern may not be a pattern in which lines intersect each other at the center of the pattern, as illustrated in FIG. 9A, but may be a pattern which has a rectangular shape with four points (a), (b), (c), and (d), as illustrated in FIG. 9B. This pattern is formed of the line connecting the points (a) and (b), the line connecting the points (c) and (d), the line connecting the points (a) and (c), and the line connecting the points (b) and (d). Hereinafter, the description will be made using the pattern illustrated in FIG. 9A. However, even when the same process is performed using the pattern illustrated in FIG. 9B, a misalignment amount, a distortion amount, or bias amount can be measured to perform correction.

FIG. 10 is a diagram illustrating a sheet and a method for measuring trapezoidal distortion of a measurement pattern formed as an image on the sheet.

The edge detection unit 40 installed in the sheet conveyance path between the fixing unit 30 and the discharge roller 37 includes two photoelectric conversion sensors 1005 and 1006 respectively installed on the main-scanning rear end side and the main-scanning front end side.

The sensor 1005 detects a pattern 1004 formed on the sheet 1003 being conveyed. At this time, the position of the pattern detected by the sensor 1005 is a position indicated by a line 1001. Further, the sensor 1006 detects the pattern 1004 formed on the sheet 1003 being conveyed. At this time, the position of the pattern detected by the sensor 1006 is a position indicated by a line 1002.

Four edges 1007, 1009, 1011, and 1012 of the pattern 1004 are detected by the sensor 1005. Four edges 1008, 1010, 1013, and 1014 of the pattern 1004 are detected by the sensor 1006.

The coordinates of four points 1015 to 1018 can be calculated from the coordinates of the eight edges. At this time, the values of the coordinates are determined with reference to any one point of the sheet sub-scanning front end side.

A line sensor mounted on the flat head scanner can be used as the edge detection unit 40. In this case, a sheet on which a pattern is formed is output, and a user mounts the sheet on a scanner. Trapezoidal distortion is corrected using the coordinates obtained in this way. A correction method will be described below.

When a line connecting the points 1015 and 1016 to each other and a line connecting the points 1017 and 1018 to each other are formed as images even at the time of correcting trapezoidal distortion, as illustrated in FIG. 9B, the correction can be performed. Accordingly, it can be considered that a pattern of such two lines is formed as an image on the sheet. In this case, the points 1007, 1008, 1012, and 1014 are formed as a rectangle to be measured.

Figure 11:
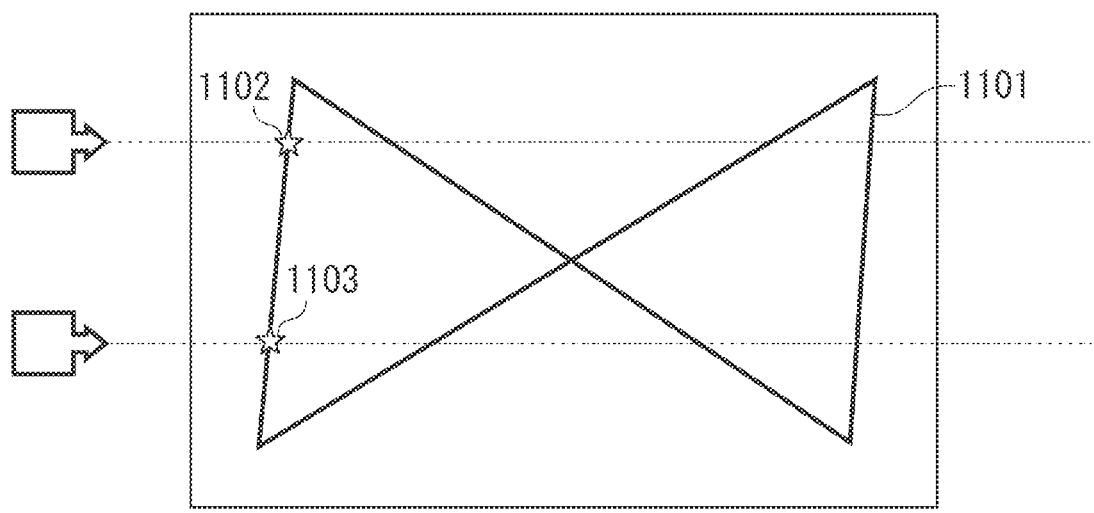
FIG. 11 illustrates a method for measuring an amount of the skew distortion.

FIG. 11 is a diagram illustrating a sheet and a method for measuring skew distortion of a measurement pattern formed as an image on the sheet.

The positions of two points 1102 and 1103 in the sub-scanning direction on a pattern 1101 are detected using the sensors installed at two positions, as described above. Thus, an angle formed by the line segment formed by the points 1102 and 1103, and a side of the sheet in the main-scanning direction can be calculated.

Correcting skew distortion is performed using the value. A correction method will be described below.

Figure 12:
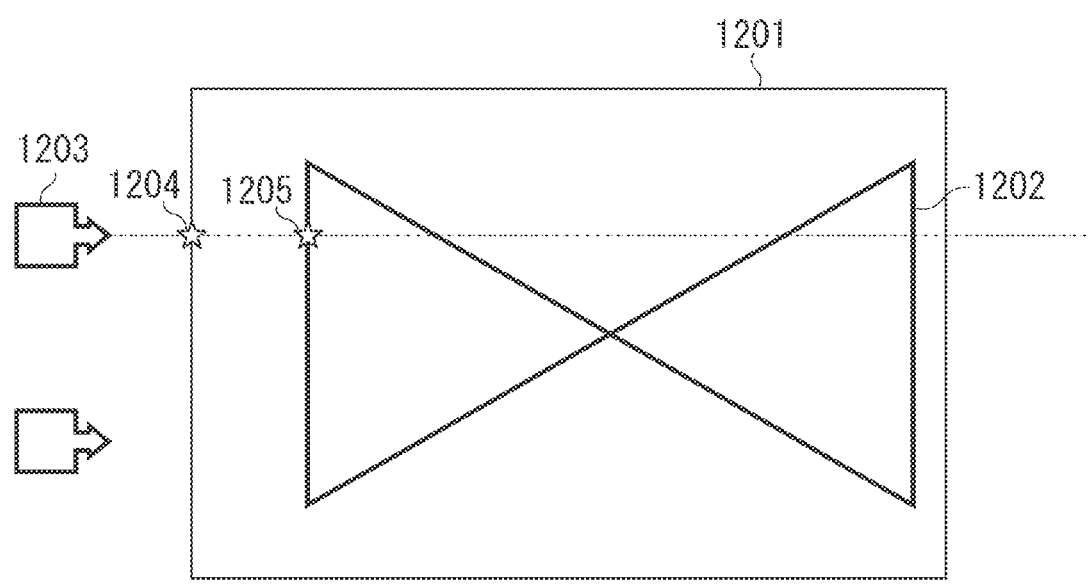
FIG. 12 illustrates a method for measuring an amount of sub-scanning image position misalignment.

FIG. 12 is a diagram illustrating a sheet and a method for measuring sub-scanning image position misalignment of a measurement pattern formed as an image on the sheet according to an exemplary embodiment.

A distance between a point 1204 (sheet end) of the sub-scanning front end edge of a sheet 1201 detected by a sensor 1203 and a point 1205 on a pattern 1202 is measured in the sub-scanning direction by the sensor 1203. The point 1205 is a point located at a position detected by the sensor 1203 in the pattern formed on the sheet. Thus, a sub-scanning image position misalignment amount can be calculated. Correcting a sub-scanning image position misalignment amount is performed using the calculated sub-scanning image position misalignment. A correction method will be described below.

Figure 13:
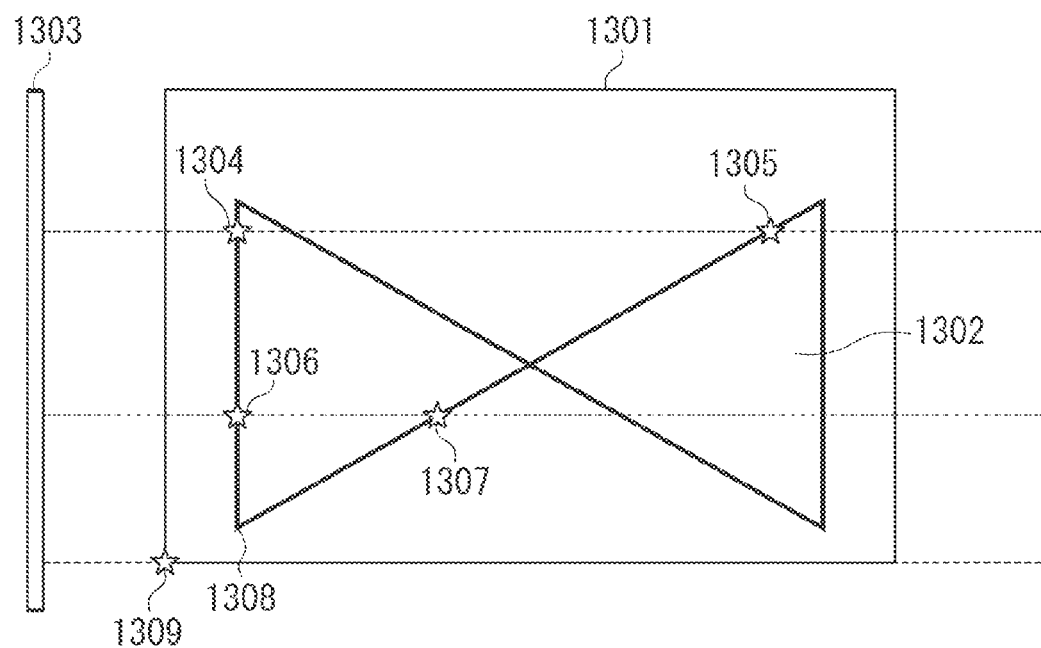
FIG. 13 illustrates a method for measuring an amount of main-scanning image position misalignment.

FIG. 13 is a diagram illustrating a sheet and a method for measuring main-scanning image position misalignment of a measurement pattern formed as an image on the sheet.

In the image forming apparatus 101 according to the exemplary embodiment, a line sensor 1303 is used as a sensor. Points 1304, 1305, 1306, and 1307 of a pattern 1302 formed on the sheet 1301 are detected by the line sensor 1303 and the coordinates of a point 1308 is calculated from the detection result. Alternatively, the coordinates of the point 1308 are directly detected.

The line sensor 1303 can calculate a main-scanning image position misalignment amount by detecting a point 1309 which is the main-scanning front end of the sheet and measuring the distance between the point 1308 and the point 1309 which is the main-scanning front end of the sheet. Correcting the main-scanning image position misalignment is performed using the main-scanning image position misalignment amount. A correction method will be described below.

Figure 14:
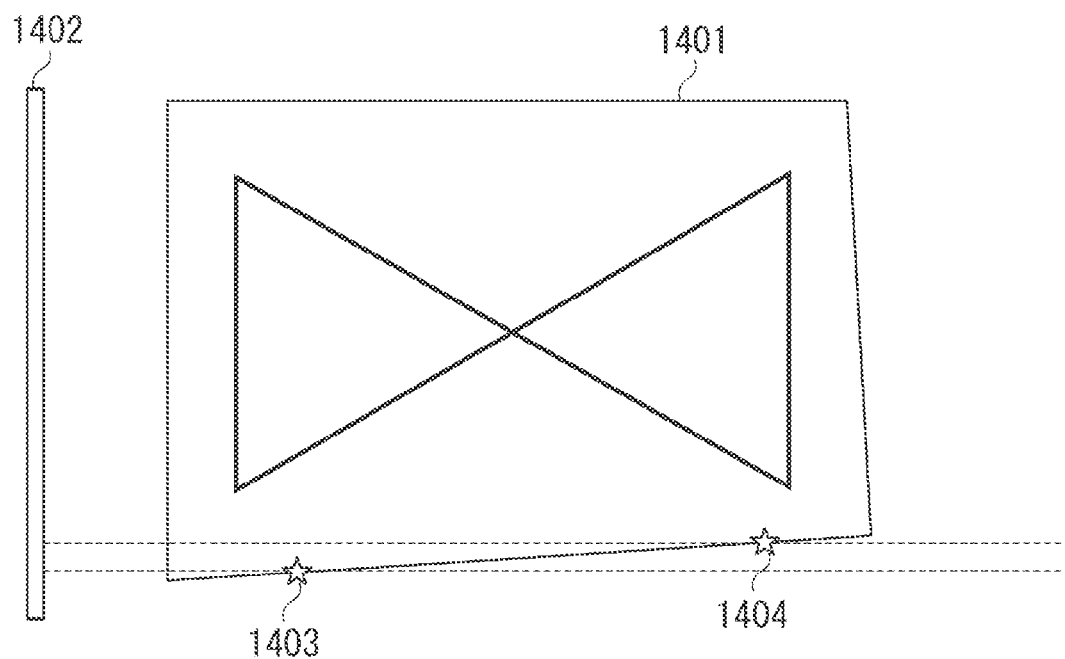
FIG. 14 illustrates a method for measuring an amount of the bias distortion.

FIG. 14 is a diagram illustrating a sheet and a method for measuring bias distortion of a measurement pattern formed as an image on the sheet.

When a line sensor 1402 detects points detectable by the sensor at two positions 1403 and 1404 in the main-scanning front end side of a sheet 1401, the line sensor 1402 can calculate an angle of the main-scanning front end side with respect to the sheet conveyance direction from the distance between the two points in the main-scanning direction and the sub-scanning direction. Correcting the bias distortion of the measurement pattern is performed using the angle. A correction method will be described below.

Figure 15:
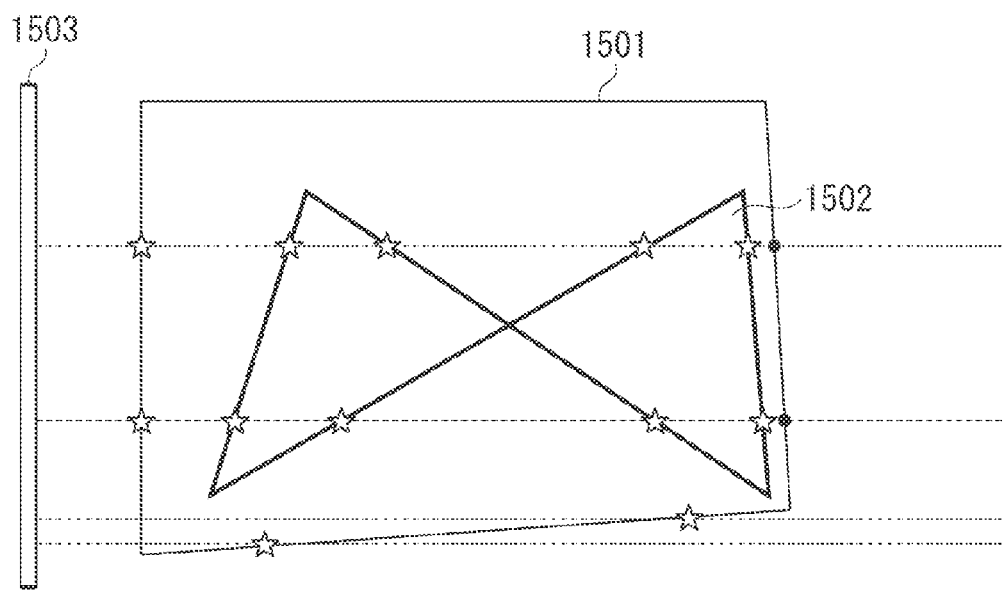
FIG. 15 illustrates a method for measuring amounts of the trapezoidal shape distortion, the skew distortion, and the bias distortion and amounts of the main- and the sub-scanning image position misalignment.

FIG. 15 is a diagram illustrating a sheet and a method for measuring trapezoidal, skew, and bias distortion and main and sub-scanning image position misalignment of a measurement pattern formed as an image on the sheet.

A line sensor 1503 calculates the coordinates of four vertexes of a pattern 1502 from the edges of eight positions forming a pattern 1502 on a sheet 1501. The line sensor 1503 also measures the coordinates of the edge of the sheet.

That is, the line sensor 1503 may measure the coordinates of four points (a), (b), (c), and (d) illustrated in FIG. 9B and the coordinate of the edge of the sheet.

Here, an edge of the sub-scanning rear end is also detected to correct the sub-scanning image position misalignment of the rear surface. Further, a reading position of the line sensor is determined based on the size of a sheet to be used at the time of forming a pattern and a misalignment amount of the pattern.

Figure 16A:
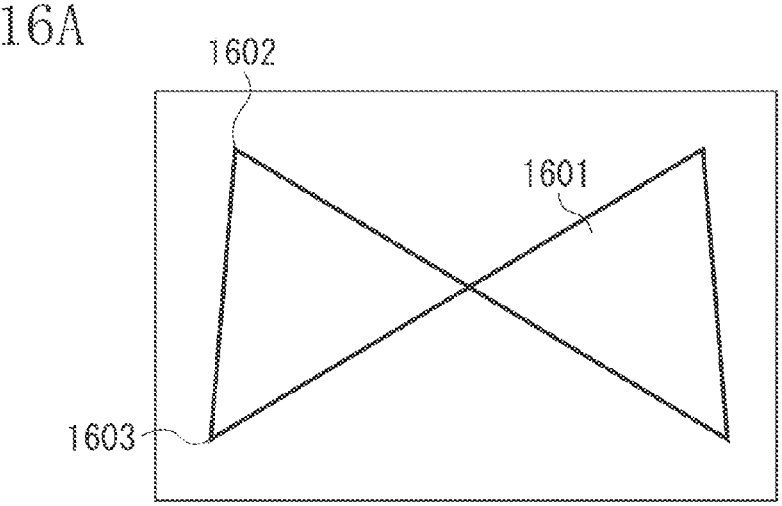
FIGS. 16A, 16B, and 16C illustrate a method for correcting the trapezoidal distortion.
Figure 16B:
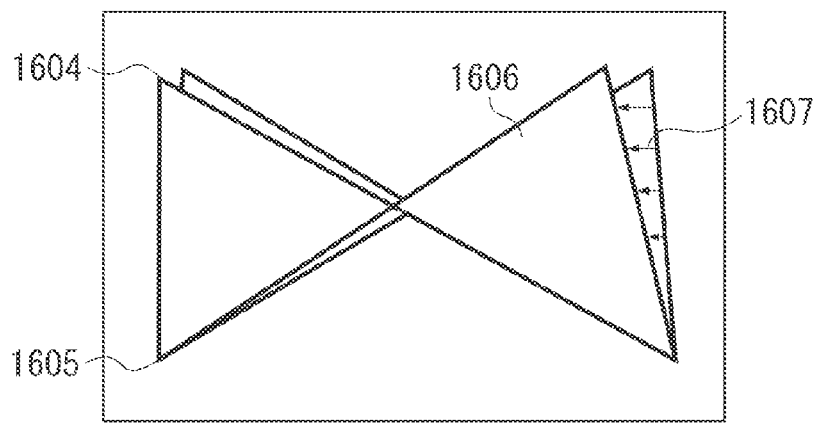
Figure 16C:
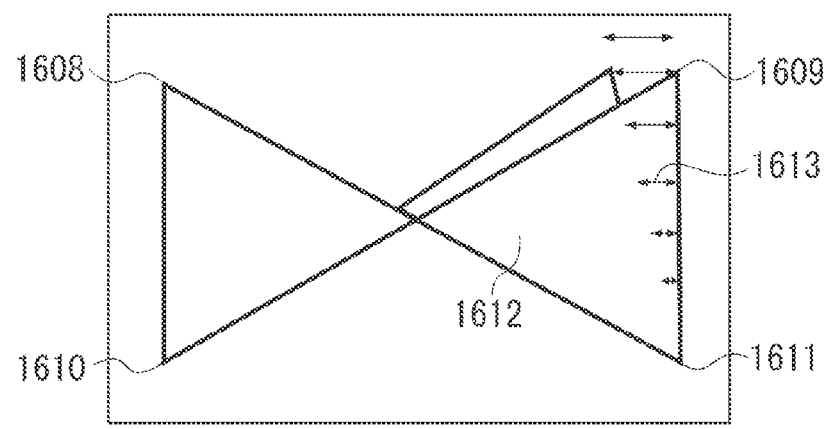

FIGS. 16A to 16C are diagrams illustrating a method for correcting trapezoidal distortion.

In order to correct trapezoidal distortion of a pattern 1601 formed on a sheet illustrated in FIG. 16A, the image processing unit 213 corrects an image so that a line segment (such as a line segment connecting points 1602 and 1603 to each other) becomes a line segment (such as a line segment connecting points 1604 and 1605 to each other) parallel to the main-scanning direction, as illustrated in FIG. 16B. A correction result is a pattern 1606.

On the other hand, the image processing unit 213 gradually shifts an image output start position in the sub-scanning direction from the main-scanning front end to the main-scanning rear end, as indicated by arrows 1607. Further, the image processing unit 213 increases a magnification ratio in the sub-scanning direction from the main-scanning front end to the main-scanning rear end so that the length of a first line segment (such as a line segment connecting points 1608 and 1610 to each other) is identical to the length of a second line segment (such as a line segment connecting points 1609 and 1611 to each other), as illustrated in FIG. 16C.

As a result, as illustrated by arrows 1613, the entire image is enlarged to generate a correction pattern 1612. Here, the image may be enlarged by zooming or an increase in pixels. In this way, by performing the correction so that there is no difference between the lengths of the lines connecting two points detected at a plurality of positions, correcting the trapezoidal distortion can be performed.

Figure 17A:
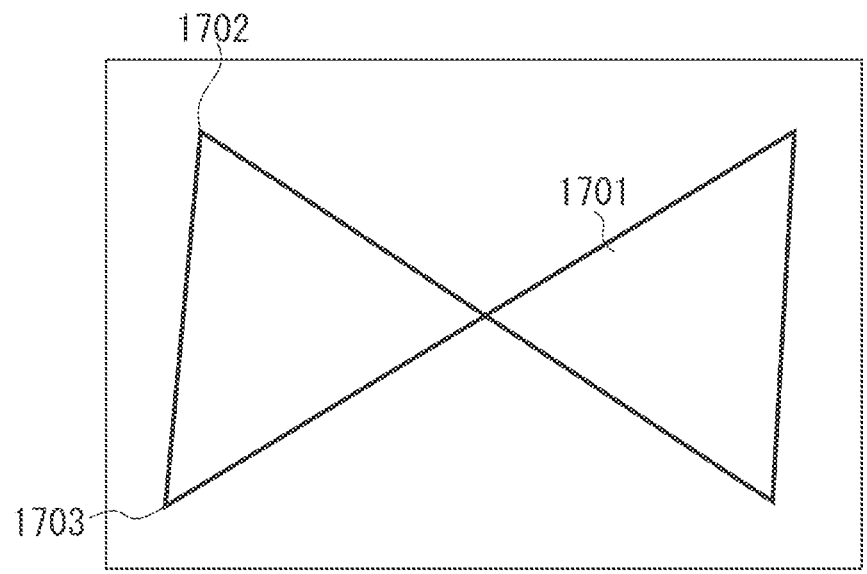
FIGS. 17A and 17B illustrate a method for correcting the skew distortion.
Figure 17B:
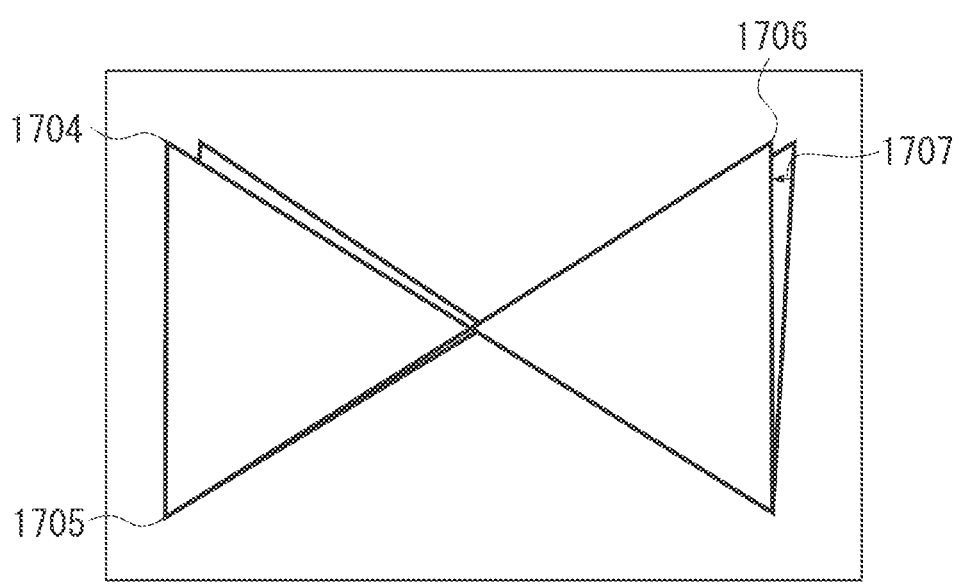

FIGS. 17A and 17B are diagrams illustrating a method for correcting skew distortion.

The image processing unit 213 corrects skew distortion 1701 of a pattern formed on a sheet. Correcting the skew distortion is performed using an angle formed between a line segment formed on the pattern and a side of the sheet in the main-scanning direction.

Therefore, an image is corrected so that a line segment (such as a line segment connecting points 1702 and 1703 to each other illustrated in FIG. 17A) becomes a line segment (a line segment connecting points 1704 and 1705 to each other) parallel to aside of the sheet in the main-scanning direction, as illustrated in FIG. 17B.

The image processing unit 213 gradually shifts an image output start position in the sub-scanning direction from the main-scanning front end to the main-scanning rear end, as indicated by an arrow 1707 in FIG. 17B. Thus, correcting the skew distortion is performed so that an image is formed as in a pattern 1706.

Figure 18A:
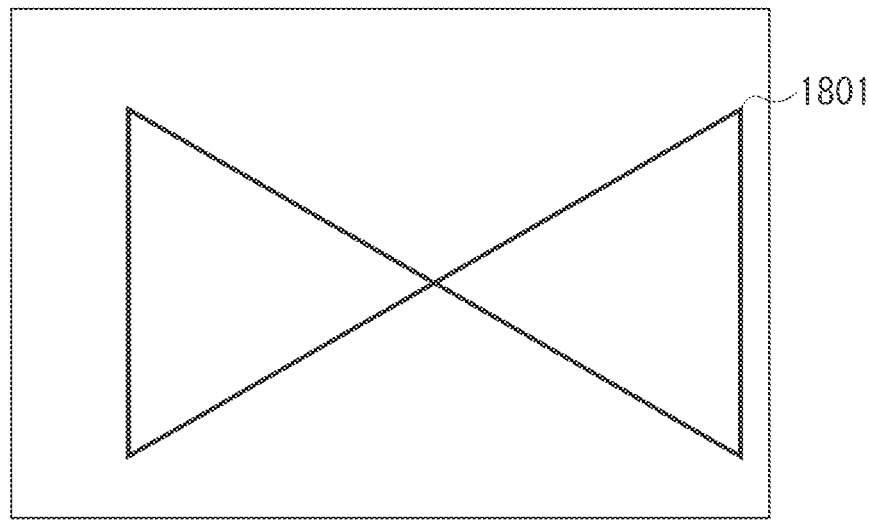
FIGS. 18A and 18B illustrate a method for correcting the main- and the sub-scanning image position misalignment.
Figure 18B:
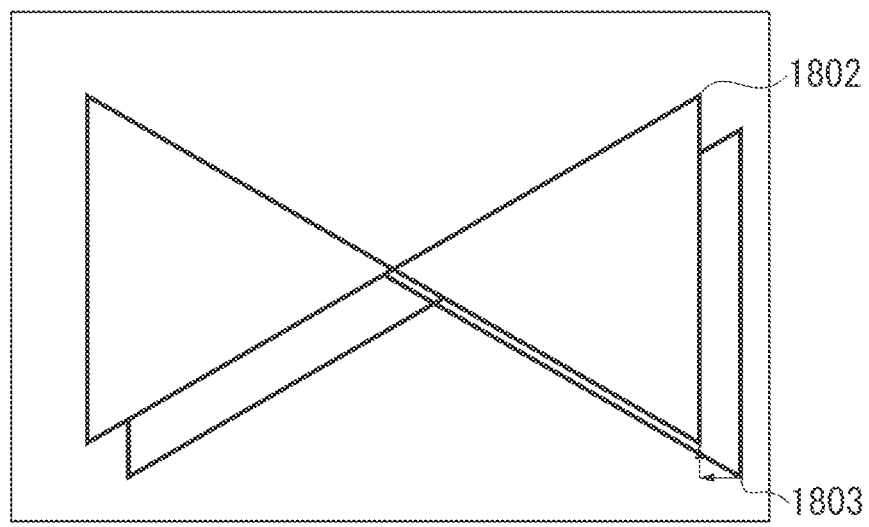

FIGS. 18A and 18B are diagrams illustrating a method for correcting main and sub-scanning image position misalignment.

In order to correct main and sub-scanning image position misalignment 1801 of a pattern illustrated in FIG. 18A, the image processing unit 213 moves main and sub-scanning image positions on the RAM 223 in a direction indicated by an arrow 1803 illustrated in FIG. 18B. Alternatively, correcting the main and sub-scanning image position misalignment is performed by changing the image beginning position so that an image is formed as in a pattern 1802. Thus, correcting the main and sub-scanning image position misalignment can be performed using the distance between the edge of the sheet to the pattern.

Figure 19A:
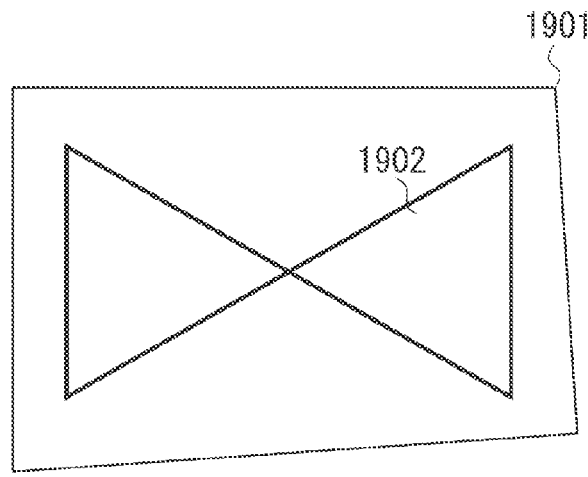
FIGS. 19A, 19B, and 19C illustrate a method for correcting the bias distortion.
Figure 19B:
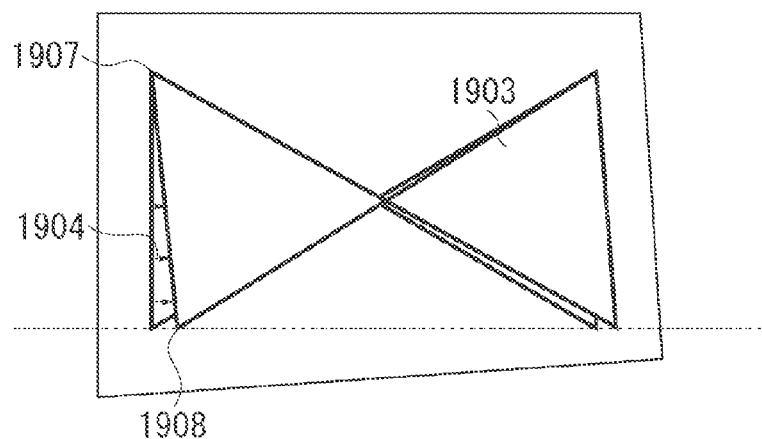
Figure 19C:
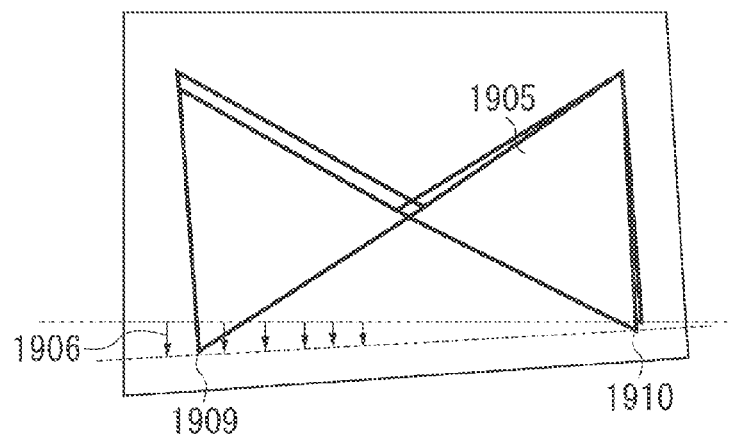

FIGS. 19A to 19C are diagrams illustrating a method for correcting bias distortion. A pattern 1902 formed on a sheet 1901 distorted before printing is illustrated in FIG. 19A.

First, as illustrated in FIG. 19B, the image processing unit 213 performs correcting bias distortion of the image forming pattern 1902 formed on the sheet 1901 to be suitable for the distortion of the sheet. That is, correcting an image forming position is performed with reference to the distorted sheet. Therefore, correcting (correcting skew distortion) is performed so that a line segment (a line segment connecting points 1907 and 1908 to each other) is perpendicular to the main-scanning front end side of the sheet, as if skew distortion was corrected, as indicated by arrows 1904. Thus, the image forming pattern 1902 is corrected from an image with bias distortion to an image with skew distortion, as in a pattern 1903.

Subsequent processing is illustrated in FIG. 19C. The image processing unit 213 moves an image in a unit of one sub-scanning line in the main-scanning direction in a direction indicated by arrows 1906 using the angle acquired in FIG. 14 so that a line segment (a line segment connecting points 1909 and 1910 to each other) becomes parallel to the main-scanning front end side of the sheet.

Through the above-mentioned processing, the image processing unit 213 performs correcting so that a pattern 1905 aligned to the bias distortion of the sheet 1901 can be formed as an image.

In the exemplary embodiment, correcting misalignment, distortion, and bias caused due to other reasons is performed by reading a pattern formed on one sheet.

Specifically, correcting an image to be output is performed by reading a pattern formed on one sheet, acquiring a trapezoidal distortion amount, a skew distortion amount, a bias distortion amount, and a main and sub-scanning image position misalignment amount using the detected coordinates, and using the acquired values.

FIGS. 20A to 20E are image diagrams illustrating a method for correcting trapezoidal distortion, skew distortion, bias distortion, and main and sub-scanning image position misalignment at one time.

Figure 20A:
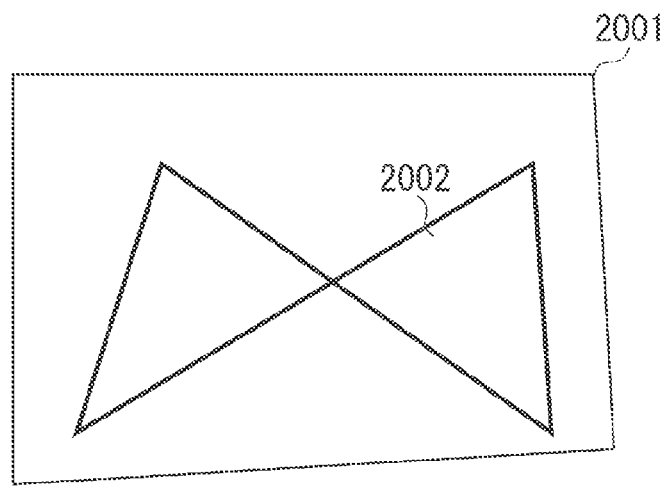
FIGS. 20A, 20B, 20C, 20D, and 20E illustrate a method for correcting the trapezoidal distortion, the skew distortion, the bias distortion, and the main- and the sub-scanning image position misalignment.
Figure 20B:
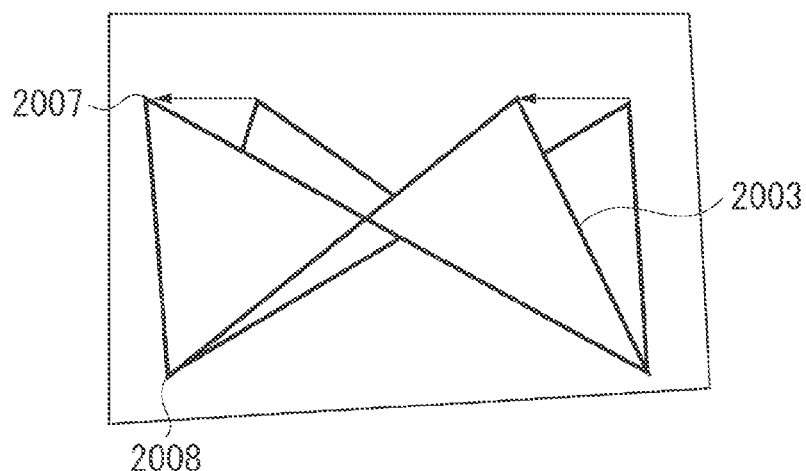

As illustrated in FIG. 20A, the image processing unit 213 corrects a distorted image forming pattern 2002 formed on a sheet 2001 distorted before printing to be suitable for the distortion of the sheet, as in a pattern 2003. Specifically, as in the pattern 2003 illustrated in FIG. 20B, correcting skew distortion is performed so that a line segment (a line segment connecting points 2007 and 2008 to each other) is perpendicular to the main-scanning front end side of the sheet.

Figure 20C:
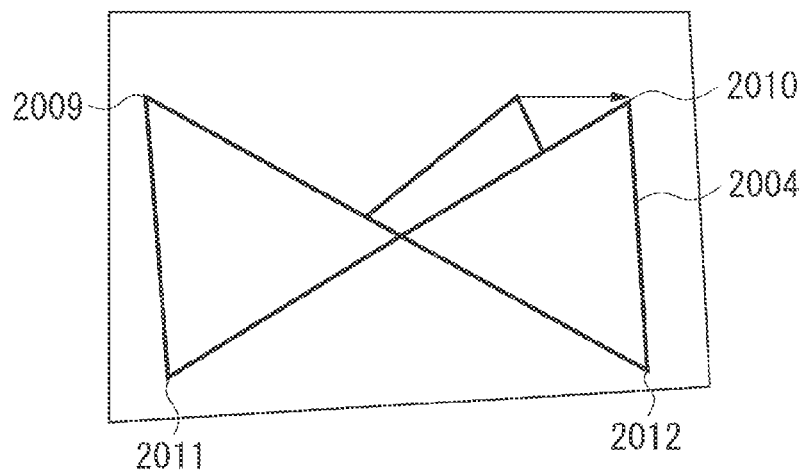

Further, the corrected pattern 2003 is corrected, as in a pattern 2004 illustrated in FIG. 20C. Specifically, the image processing unit 213 performs correcting so that the length of a line segment (a line segment connecting points 2009 and 2010 to each other) is identical to the length of a line segment (a line segment connecting points 2011 and 2012 to each other). For example, an image is enlarged by increasing a magnification ratio in the sub-scanning direction from the main-scanning front end to the main-scanning rear end.

Figure 20D:
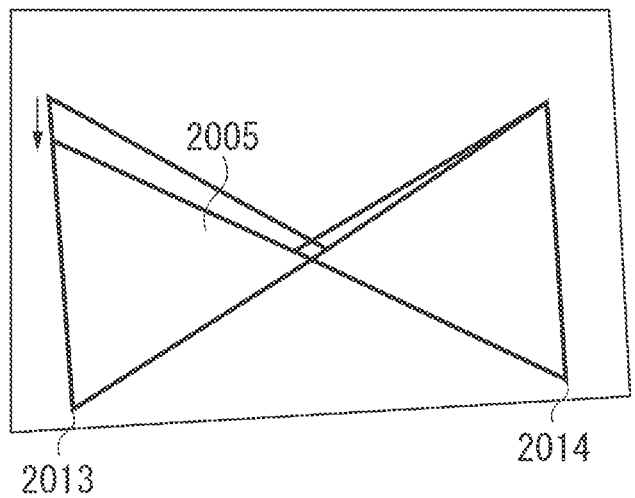

Next, the corrected pattern 2004 is corrected, as in a pattern 2005 illustrated in FIG. 20D. Specifically, the image processing unit 213 moves an image in a unit of one sub-scanning line in the main-scanning direction so that a line segment (a line segment connecting points 2013 and 2014 to each other) becomes parallel to the main-scanning front end side of the sheet. Alternatively, the image beginning position is shifted every sub-scanning line.

Figure 20E:
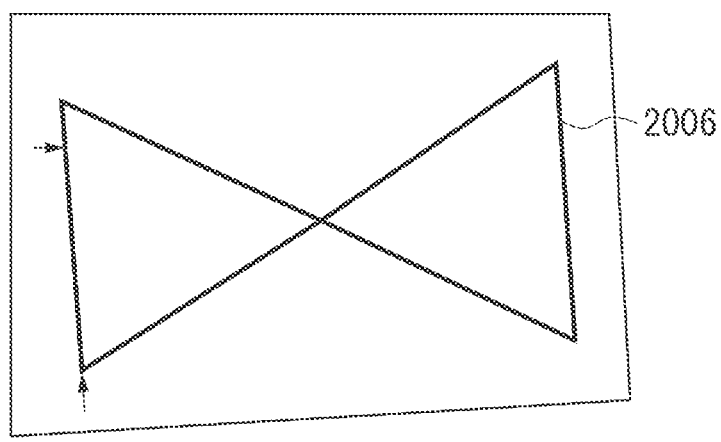

Finally, the corrected pattern 2005 is corrected, as in a pattern 2006 illustrated in FIG. 20E. Specifically, in order to correct the main and sub-scanning image position misalignment, the image processing unit 213 moves an image position in the main-scanning direction and the sub-scanning direction on the RAM 223. Alternatively, the correction is performed so that an image is formed at any image forming position by changing the image beginning position.

Hereinafter, processing performed by the image forming apparatus 101 according to the exemplary embodiment will be described with reference to flowcharts. Each step of a flow is basically performed by the CPU 201, if otherwise not mentioned.

Figure 21:
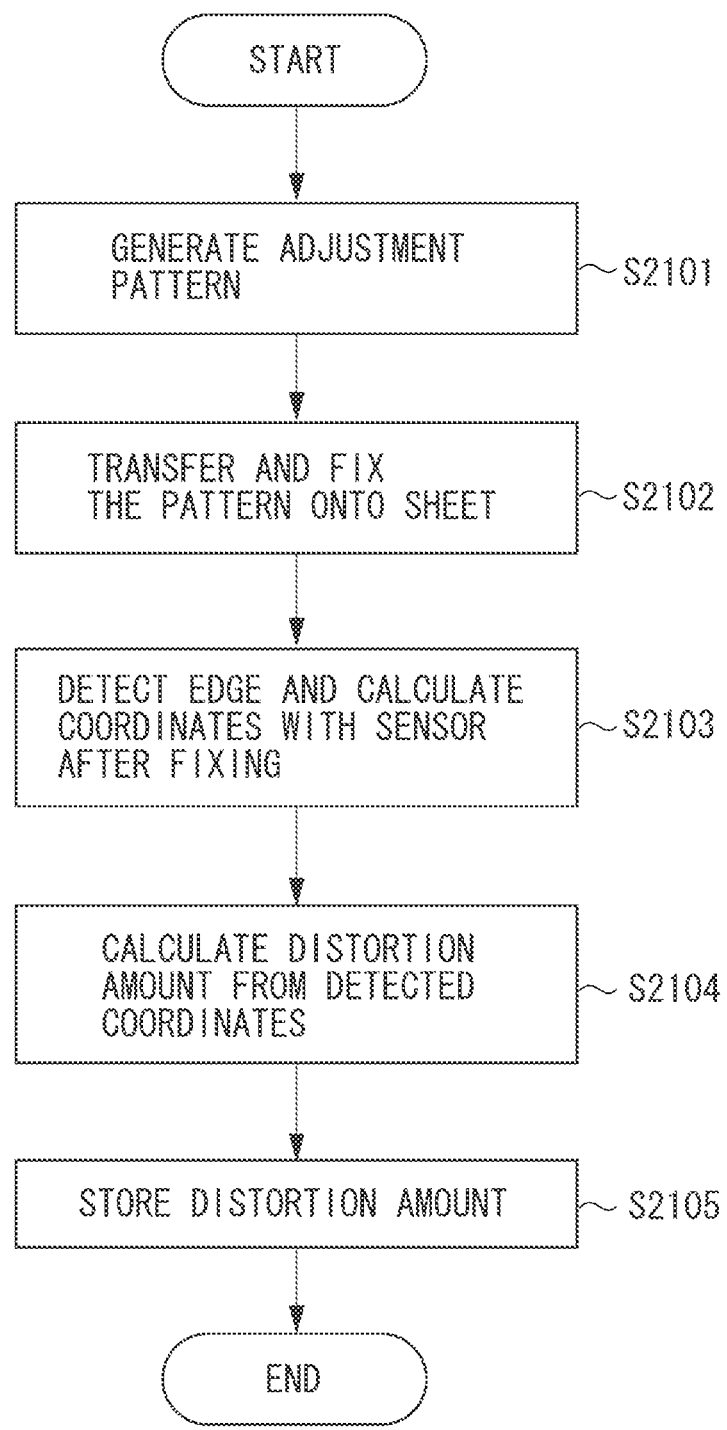
FIG. 21 is a flowchart illustrating processing for calculating a distortion amount.

FIG. 21 is a flowchart illustrating calculation of a distortion amount according to the exemplary embodiment. The distortion amount indicates a misalignment amount for an image position at the time of occurrence of an image forming position misalignment, a distortion amount at the time of occurrence of trapezoidal distortion or bias distortion, and a bias angle at the time of occurrence of bias.

When the operation unit 211 receives an instruction to correct a distortion amount from the user through the information processing apparatus 100, then in step 2101, the image forming apparatus 101 generates an adjustment pattern 902 on the RAM 223.

In step S2102, the CPU 201 transfers image data on the RAM 223 to the printer 210 via the printer I/F 206 and the printer 210 forms the pattern as an image on the sheet. In step S2103, the sensor 40 in the printer 210 detects the coordinates (the coordinates of an edge of the sheet or the pattern on the sheet) illustrated in FIG. 15, and the printer 210 transfers coordinate information to the image control unit 200.

In step S2104, the image control unit 200 calculates distortion amounts for the sheet and the image from the acquired coordinate information and then, in step S2105, stores the distortion amounts in the RAM 223.

Figure 27:
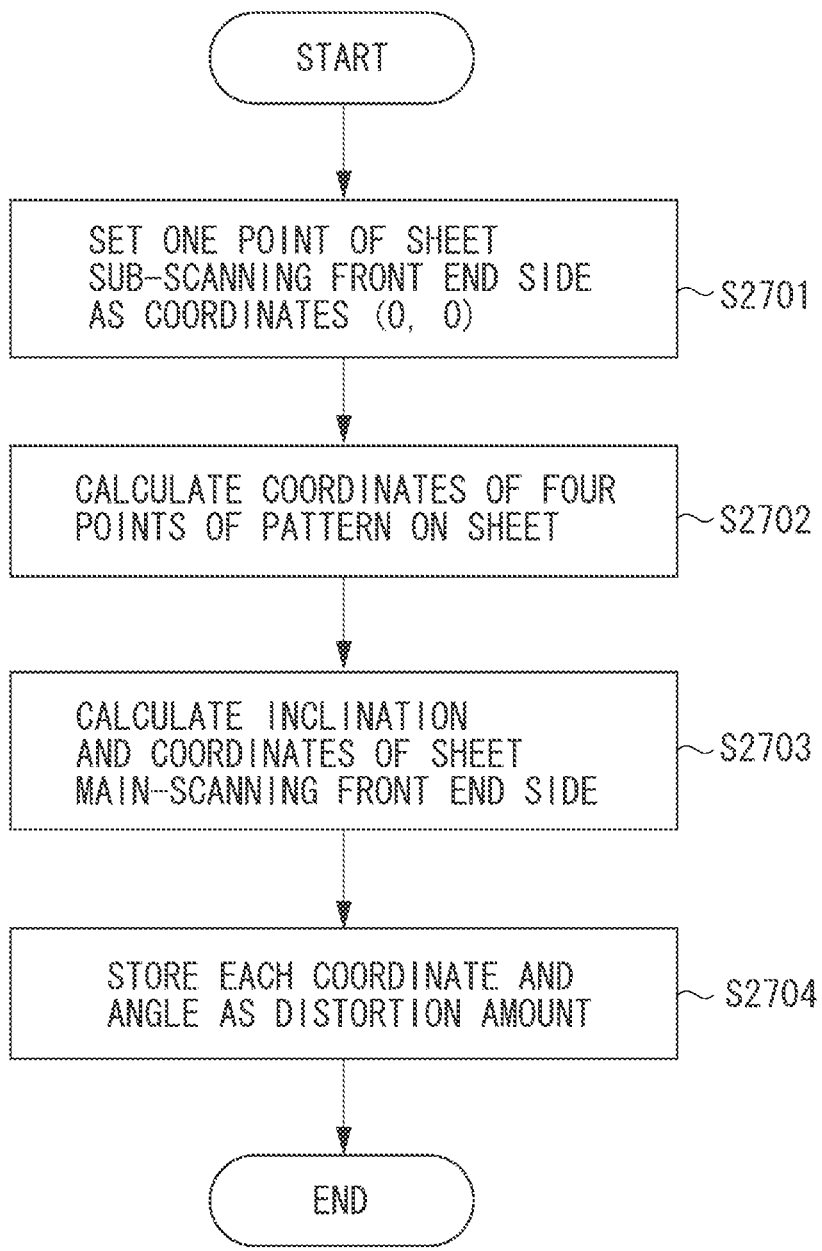
FIG. 27 is a flowchart illustrating a method for measuring amounts of the trapezoidal distortion, the skew distortion, and the bias distortion, and amounts of the main- and the sub-scanning image position misalignment.

FIG. 27 is a flowchart illustrating a method for measuring trapezoidal distortion, skew distortion, bias distortion, and main and sub-scanning image position misalignment according to the exemplary embodiment. That is, this flowchart is a detailed flowchart of steps S2103 and S2104 in FIG. 21.

When the sensor 40 in the printer 210 detects one point of the sheet sub-scanning front end side, then in step S2701, the image forming apparatus 101 determines the coordinates (0, 0) of the one point and detects the coordinates of another one point of the sheet sub-scanning front end side.

In step S2702, the CPU 201 calculates the coordinates of four vertexes of a rectangle from the respective edges of the pattern on the sheet. In step S2703, the CPU 201 calculates the coordinates from the edges of the sheet main-scanning front end side and calculates an inclination from the coordinates. Then, in step S2704, the CPU 201 stores the coordinate information or the angle information as the distortion amount in the RAM 223.

Figure 22:
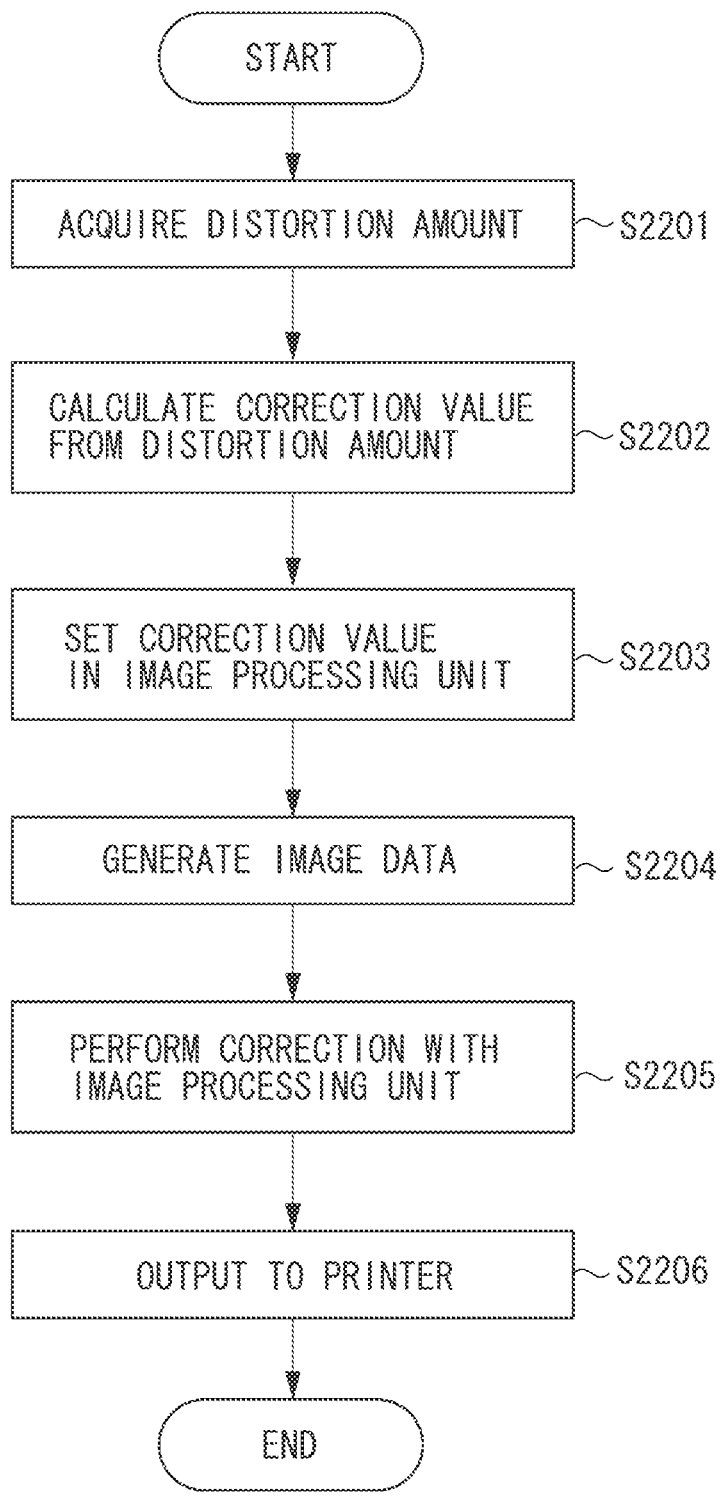
FIG. 22 is a flowchart illustrating processing for correcting distortion.

FIG. 22 is a flowchart illustrating processing for correcting distortion according to the exemplary embodiment.

When the operation unit 211 receives a printing instruction from the user through the information processing apparatus 100, then in step S2201, the image forming apparatus 101 acquires the distortion amount stored in the RAM 223 in step S2105.

Then, in step S2202, the CPU 201 calculates an image correction value from the distortion amount. In step S2203, the CPU 201 sets the calculated image correction value in the image processing unit 213.

In step S2204, the CPU 201 stores image data input from the network 102 or the scanner 209 in the RAM 223. In step S2205, the CPU 201 causes the image processing unit 213 to correct distortion of the image data on the RAM 223 and then, in step S2206, outputs the distortion-corrected image data to the printer 210 via the printer I/F 206.

In the exemplary embodiment, correcting the distortion is performed by the image processing unit 213. However, correcting the distortion may be performed through digital image processing and analog image processing by an image processing module in the CPU 201 or the printer 210.

In the exemplary embodiment, the distortion amount is stored in the RAM 223. However, the correction value itself may be stored in the RAM 223.

Figure 23:
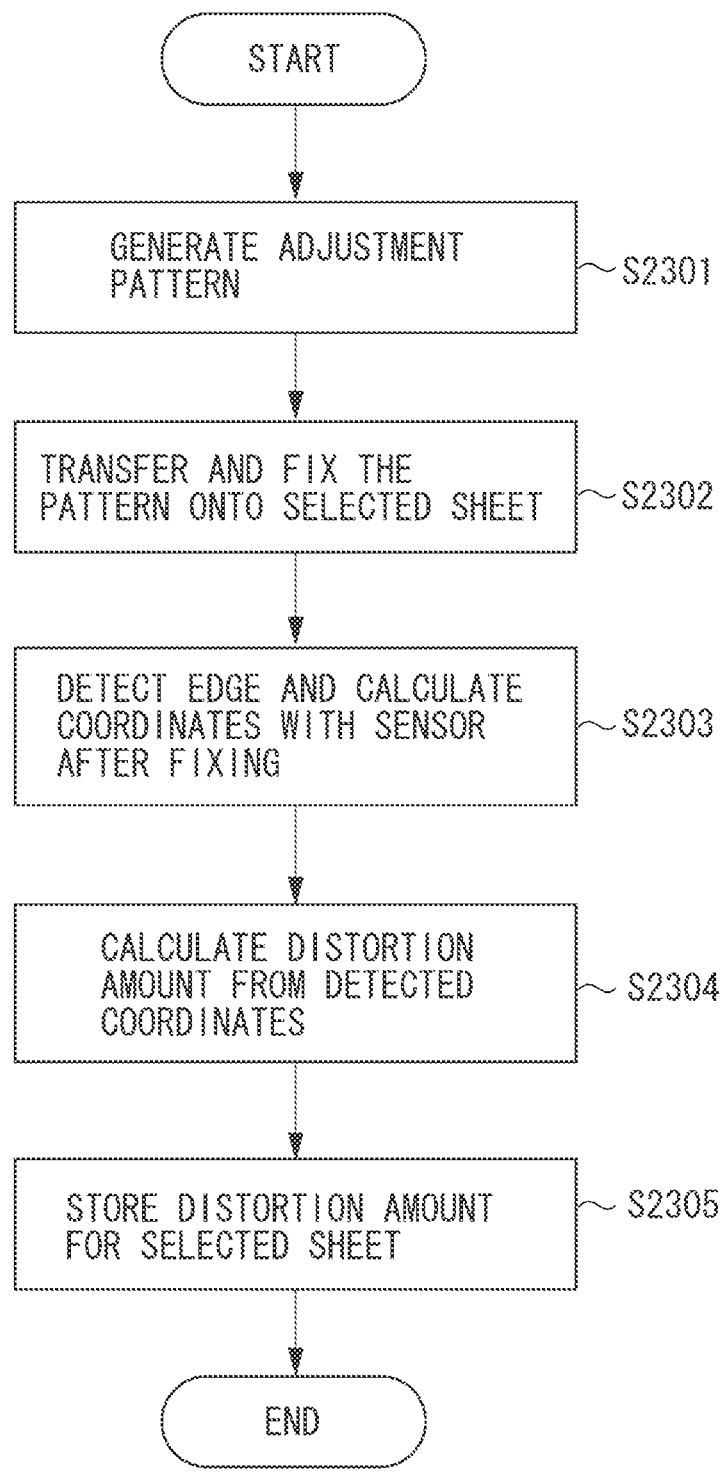
FIG. 23 is a flowchart illustrating processing for calculating and storing a distortion amount for each sheet.

FIG. 23 is a flowchart illustrating processing for calculating and storing a distortion amount for the same sheet according to the exemplary embodiment. The same sheet refers to a plurality of sheet bundles wrapped in the same package when the sheets are purchased. Since a distortion amount occurring before printing of the sheets wrapped in the same package is similar, a calculated distortion amount is commonly used.

When the image forming apparatus 101 receives an instruction to designate a sheet type and an instruction to correct a distortion amount from the user through the operation unit 211 or the information processing apparatus 100, then in step S2301, the image forming apparatus 101 generates the adjustment pattern 902 on the RAM 223.

In step S2302, the CPU 201 transfers the image data on the RAM 223 to the printer 210 via the printer I/F 206, and the printer 210 forms the pattern on the sheet selected by the user as an image. In step S2303, the CPU 201 causes the sensor 40 in the printer 210 to detect the sheet or the coordinates of the pattern on the sheet, and the printer 210 transfers the coordinate information to the image control unit 200.

Then, in step S2304, the image control unit 200 calculates the distortion amounts for the sheet and the image from the acquired coordinate information and then, in step S2305, stores the distortion amounts in association with the sheet designated by the user in the RAM 223.

Figure 24:
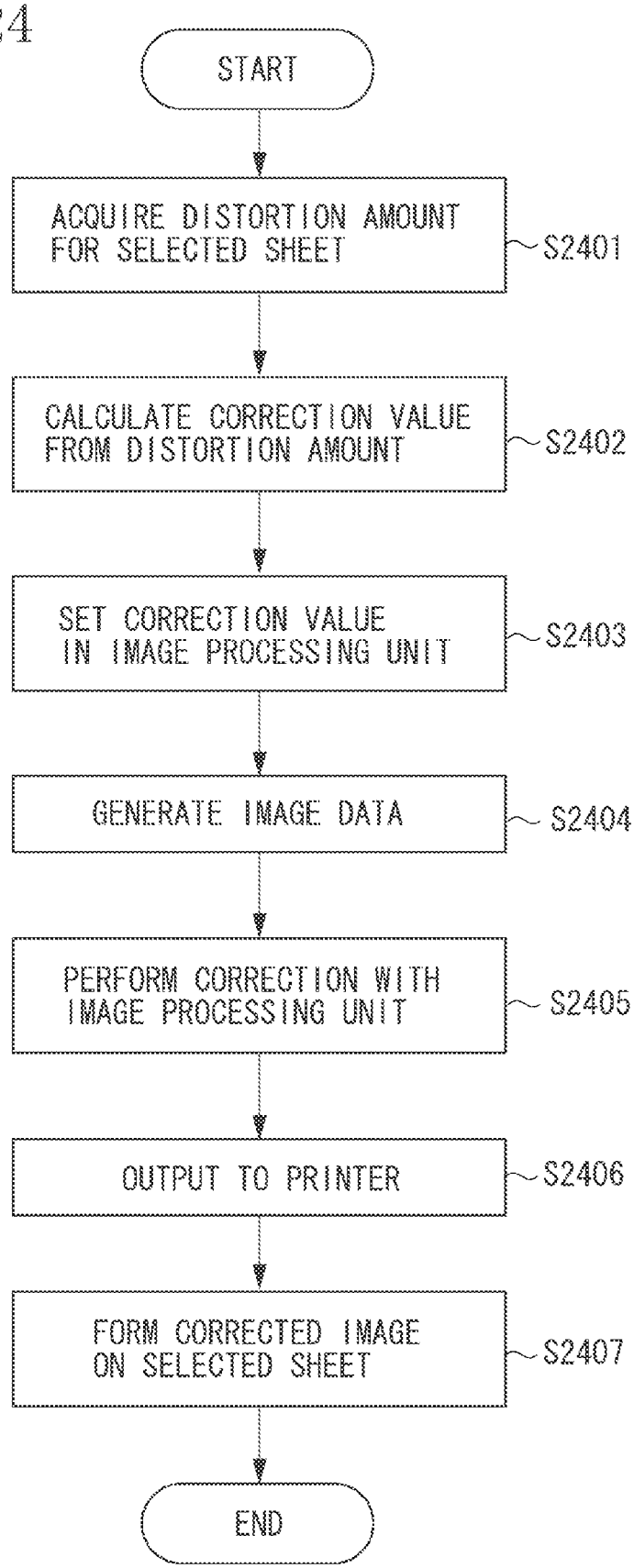
FIG. 24 is a flowchart illustrating processing for correcting distortion in each sheet.

FIG. 24 is a flowchart illustrating processing for correcting distortion in each sheet according to the exemplary embodiment.

When the image forming apparatus 101 receives a printing instruction to designate a sheet from the user through the operation unit 211 or the information processing apparatus 100, then in step S2401, the image forming apparatus 101 acquires the distortion amount for the sheet stored in the RAM 223 in step S2305.

In step S2402, the CPU 201 calculates the image correction value from the distortion amount. In step S2403, the CPU 201 sets the calculated image correction value in the image processing unit 213. Then, in step S2404, the CPU 201 stores the image data input from the network 102 or the scanner 209 in the RAM 223.

In step S2405, the CPU 201 causes the image processing unit 213 to correct the distortion of the image data on the RAM 223 and then, in step S2406, outputs the distortion-corrected image data to the printer 210 via the printer I/F 206. Then, in step S2407, the printer 210 forms the distortion-corrected image data as an image on the sheet selected by the user.

Figure 25:
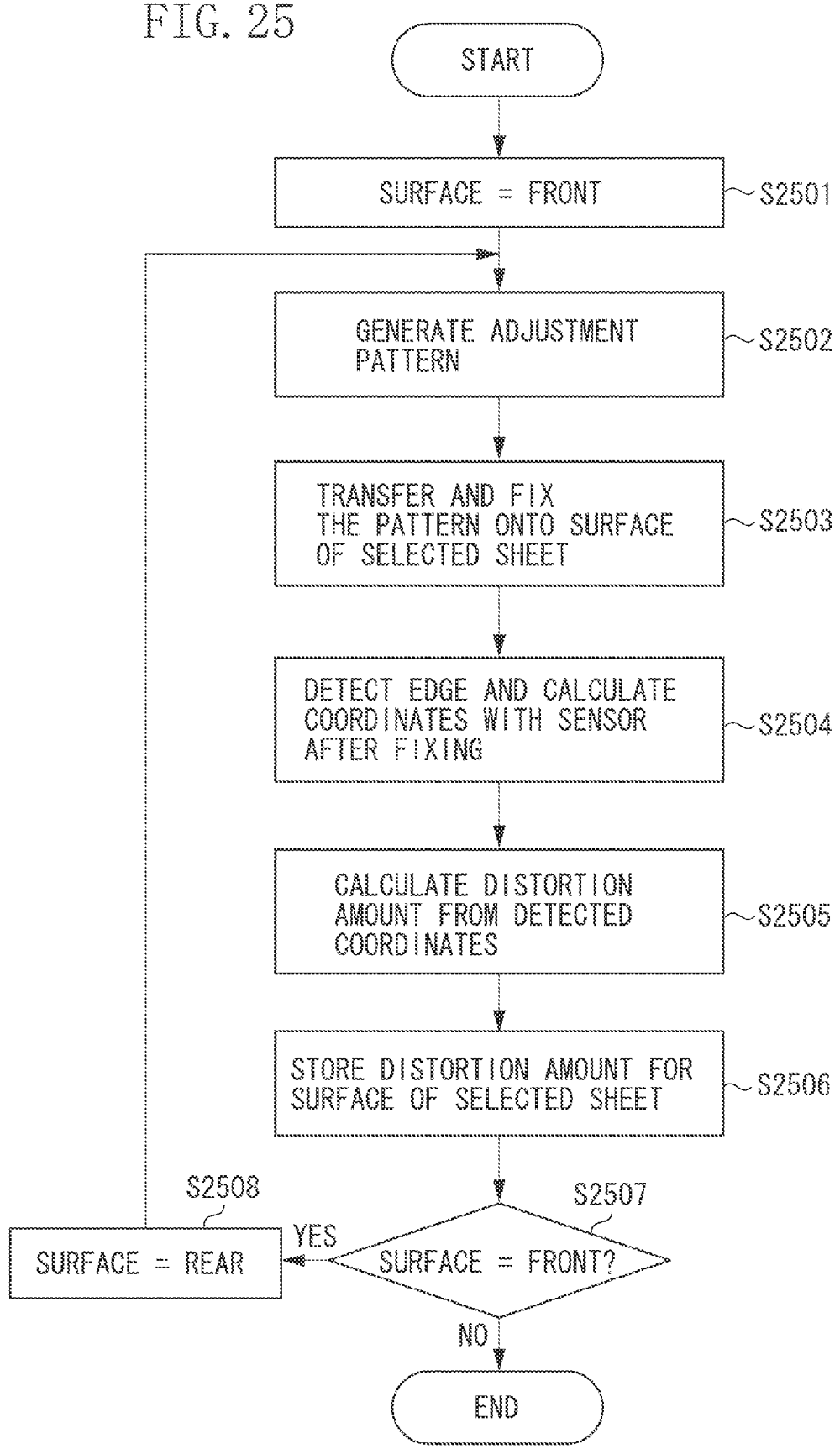
FIG. 25 is a flowchart illustrating processing for calculating a distortion amount separately for front and rear surfaces of a sheet.

FIG. 25 is a flowchart illustrating processing for calculating a distortion amount separately for front and rear surfaces of a sheet according to the exemplary embodiment.

When the information processing apparatus 101 receives an instruction to designate a sheet type and an instruction to correct both-side distortion amounts from the user through the operation unit 211 or the information processing apparatus 100, then in step S2501, the image forming apparatus 101 starts an adjustment mode of the front surface.

In step S2502, the CPU 201 generates the adjustment pattern 902 on the RAM 223. Then, in step S2503, the CPU 201 transfers the image data on the RAM 223 to the printer 210 via the printer I/F 206 and the printer 210 forms the pattern as an image on the front surface of a sheet, when the user selects the sheets.

In step S2504, the CPU 201 causes the sensor 40 in the printer 210 to detect the sheet or the coordinates of the pattern on the sheet, and the printer 210 transfers the coordinate information to the image control unit 200. In step S2505, the image control unit 200 calculates the distortion amounts for the sheet and the image from the acquired coordinate information and then, in step S2506, stores the distortion amounts in association with the front surface of the sheet designated by the user in the RAM 223.

Then, in step S2507, the CPU 201 determines whether the mode is a front surface mode. When the mode is the front surface mode, then in step S2508, the CPU 201 sets the mode to the rear surface, performs the processing of steps S2502 to S2505 in the rear surface mode, and then ends the processing. To calculate the distortion amount for the rear surface, the CPU 201 needs to detect the edge of the sub-scanning rear end illustrated in FIG. 15.

Figure 26:
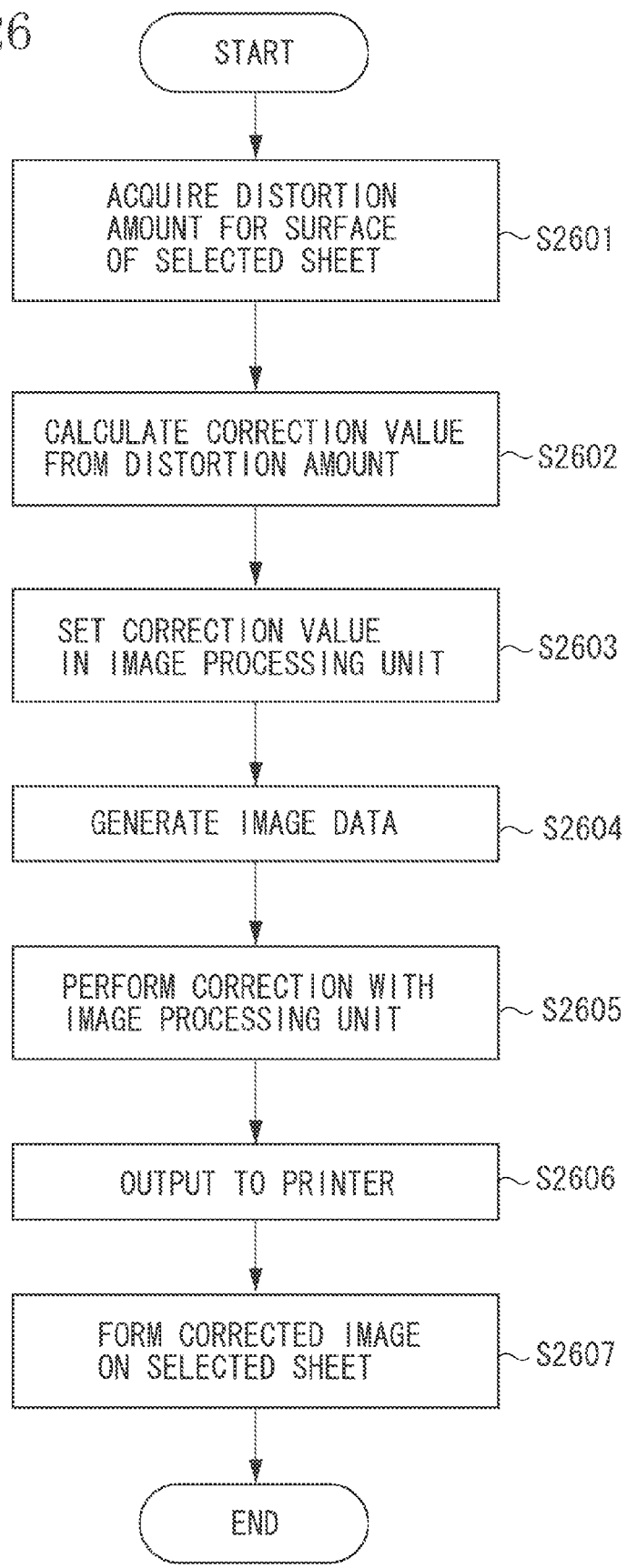
FIG. 26 is a flowchart illustrating processing for correcting distortion separately for the front and the rear surfaces of the sheet.

FIG. 26 is a flowchart illustrating processing for correcting distortion separately for the front and the rear surfaces of a sheet according to the exemplary embodiment.

When the image forming apparatus 101 receives an instruction to print both sides of a sheet designated by the user through the operation unit 211 and the information processing apparatus 100, then in step S2601, the image forming apparatus 101 acquires a distortion amount for a printing surface of the sheet stored in the RAM 223 in step S2305.

In step S2602, the CPU 201 calculates the image correction value from the distortion amount. In step S2603, the CPU 201 sets the calculated image correction value in the image processing unit 213. Then, in step S2604, the CPU 201 stores the image data input from the network 102 or the scanner 209 in the RAM 223.

In step S2605, the CPU 201 causes the image processing unit 213 to correct the distortion of the image data on the RAM 223 and then, in step S2606, outputs the distortion-corrected image data to the printer 210 via the printer I/F 206. Then, in step S2607, the printer 210 forms the distortion-corrected image data on the printing surface of the sheet selected by the user as an image.

Figure 28:
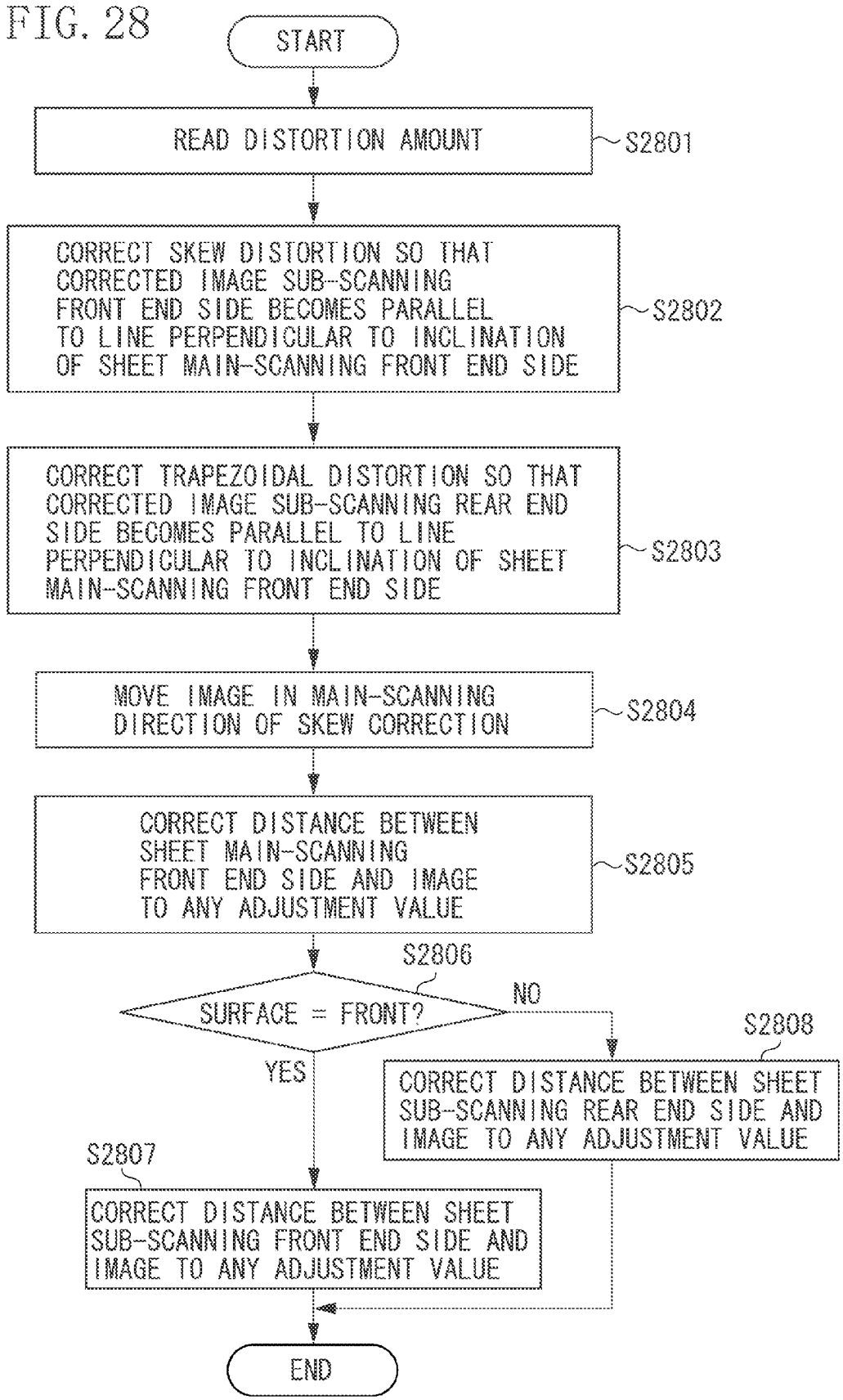
FIG. 28 is a flowchart illustrating a method for correcting the trapezoidal distortion, the skew distortion, the bias distortion, and the main- and the sub-scanning image position misalignment.

FIG. 28 is a flowchart illustrating a method for correcting trapezoidal distortion, skew distortion, bias distortion, and main and sub-scanning image position misalignment according to the exemplary embodiment, and is a flowchart for describing the processing in the image diagram of FIG. 20 as well. This flowchart is also to describe step S2205 in FIG. 22 and step S2405 in FIG. 24 in detail.

When the image forming apparatus 101 receives an instruction to perform correcting the distortion of the sheet designated by the user through the operation unit 211 or the information processing apparatus 100, then in step 2801, the image forming apparatus 101 acquires the distortion amount for a printing side of the sheet stored in the RAM 223 in step S2704.

Then, in step S2802, the CPU 201 performs correcting skew distortion so that the corrected sub-scanning front end side becomes parallel to the line perpendicular to the sheet main-scanning front end side. This step corresponds to the drawing illustrating the correction of the pattern 2002 in FIG. 20A to the pattern 2003 in FIG. 20B among FIGS. 20A to 20E.

In step S2803, the CPU 201 performs correcting distortion only by the magnification in the sub-scanning direction in the correction of trapezoidal distortion so that the corrected image sub-scanning rear end side becomes parallel to the line perpendicular to the sheet main-scanning front end side. This step corresponds to the drawing illustrating the correction of the pattern 2003 in FIG. 20B to the pattern 2004 in FIG. 20C among FIGS. 20A to 20E.

In step S2804, the CPU 201 merely moves the image in the main-scanning direction in the bias correction so that the main-scanning front end side of the rectangle becomes parallel to the sheet main-scanning front end side. This step corresponds to the drawing illustrating the correction of the pattern 2004 in FIG. 20C to the pattern 2005 in FIG. 20D among FIGS. 20A to 20E.

In step S2805, the CPU 201 performs correcting the image forming position misalignment so that the distance between the sheet main-scanning front end side and the image is corrected to a prescribed value or any designated adjustment value. This step corresponds to the drawing illustrating the correction of the pattern 2005 in FIG. 20D to the pattern 2006 in FIG. 20E among FIGS. 20A to 20E.

Then, in step S2806, the CPU 201 determines whether the surface on which the image is to be formed is the front surface of the sheet, when the user gives an instruction to perform both-side printing. When the surface on which the image is to be formed is the front surface of the sheet, then in step S2807, the CPU 201 corrects the image forming position such that the distance between the sheet sub-scanning front end side to the image is corrected to any adjustment value.

When the surface on which the image is to be formed is the rear surface of the sheet, then in step S2808, the CPU 201 corrects the image position such that the distance between the sheet sub-scanning rear end side and the image is corrected to any adjustment value.

Here, when the surface on which the image is to be formed is the front surface of the sheet, the sheet sub-scanning rear end may be adjusted. When the surface on which the image is to be formed is the rear surface of the sheet, the sheet sub-scanning front end may be adjusted. When an instruction to perform both-side printing is not given, only the front surface may be corrected and the processing ends.

In the exemplary embodiment, the methods for correcting the trapezoidal distortion, the skew distortion, the bias distortion, and the main and sub-scanning image forming position misalignment, i.e., for simultaneously correcting the four types of distortion and position misalignment have been described. However, the present invention is not limited thereto. Only various types of distortion or position misalignment selected from the distortion and misalignment may simultaneously be corrected.

When massive printing is performed, a sheet on which a pattern may be output every given constant number of sheets to correct distortion or misalignment of a printing position.

Further, after a once acquired correction value is set in the apparatus, test printing is performed so that the user can confirm a correction value. At this time, a screen on which the user can input a minute adjustment value for the correction value may be displayed on the display unit of the apparatus.

In the exemplary embodiment, misalignment, distortion, and bias caused due to different generation reasons can be corrected by reading a pattern formed on one sheet. Specifically, by reading a pattern formed on one sheet, a trapezoidal distortion amount, a skew distortion amount, a bias distortion amount, and a main and sub-scanning image position misalignment amount can be acquired using detected coordinates, and correcting an image can be performed using an acquired values.

A misalignment amount can be measured for each sheet type to perform correction. Further, a misalignment amount can separately be measured for each of the front and the rear surfaces of the same sheet to perform correction.

Thus, when the trapezoidal distortion, the skew distortion, the bias distortion, the main and sub-scanning image position misalignment, and the like are corrected, it is possible to reduce the load on the user. Further, since the correction can be performed with ease, the quality of an image can be improved with ease.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-274886 filed Dec. 15, 2011, which is hereby incorporated by reference herein in its entirety.

What is claimed is:

1. An image processing apparatus comprising:
   a forming unit configured to form, on a sheet, a pattern from which a first line and a second line each connecting two points located at positions parallel to a conveyance direction of the sheet are detectable;
   a detection unit configured to detect, from the pattern formed by the forming unit, lengths of the first and second lines each connecting two points located at positions parallel to the conveyance direction; and
   an acquisition unit configured to acquire a correction value used when correction is performed so that there is no difference between the lengths of the first and second lines detected by the detection unit,
   wherein the forming unit forms a corrected image obtained by correcting an image to be output using the correction value acquired by the acquisition unit,
   wherein the second line is shorter than the first line, the correction value acquired by the acquisition unit includes a magnification ratio in a sub-scanning direction to increase the length of the second line, and the magnification ratio differs depending on a position in the sheet with respect to a main-scanning direction of the sheet.

2. The image processing apparatus according to claim 1, wherein the detection unit is a sensor configured to be installed on a sheet conveyance path and to detect at least two points from the pattern formed on the sheet in a direction intersecting the conveyance direction of the sheet.

3. The image processing apparatus according to claim 1, wherein the detection unit is a line sensor configured to be installed on a sheet conveyance path and in a direction intersecting the conveyance direction of the sheet.

4. The image processing apparatus according to claim 1,
wherein the detection unit further detects a line connecting two points located at positions intersecting the conveyance direction of the sheet from the pattern formed on the sheet, and
wherein the correction value acquired by the acquisition unit includes an angle formed between the line connecting the two points detected by the detection unit and a side of the sheet in the main-scanning direction.

5. The image processing apparatus according to claim 1,
wherein the detection unit further detects a first point from a side of the sheet in the main-scanning direction and a second point from the pattern, and
wherein the correction value acquired by the acquisition unit further includes a distance between the side of the sheet in the main-scanning direction and the pattern from a detection result detected by the detection unit.

6. The image processing apparatus according to claim 1,
wherein the detection unit further detects at least two points among points of a side of the sheet in the sub-scanning direction among sides of the sheet, and
wherein the correction value acquired by the acquisition unit includes an angle with respect to the conveyance direction of the sheet obtained from a detection result detected by the detection unit.

7. The image processing apparatus according to claim 1,
wherein the detection unit further detects a first point from a side of the sheet in the sub-scanning direction and a second point from the pattern, and
wherein the correction value acquired by the acquisition unit includes a distance between the side of the sheet in the sub-scanning direction and the pattern obtained from a detection result detected by the detection unit.

8. An image processing method comprising:
forming, on a sheet, a pattern from which at least a first line and a second line each connecting two points located at positions parallel to a conveyance direction of the sheet are detectable;
detecting, from the formed pattern, lengths of the first and second lines each connecting two points located at positions parallel to the conveyance direction;
acquiring a correction value used when correction is performed so that there is no difference between the lengths of the first and second lines, and
forming an image obtained by correcting a corrected image to be output using the acquired correction value,
wherein the second line is shorter than the first line, the correction value acquired includes a magnification ratio in a sub-scanning direction to increase the length of the second line, and the magnification ratio differs depending on a position in the sheet with respect to a main-scanning direction of the sheet.

9. The image processing method according to claim 8, wherein in the detecting a sensor is configured to be installed on a sheet conveyance path and to detect at least two points from the pattern formed on the sheet in a direction intersecting the conveyance direction of the sheet.

10. The image processing method according to claim 8, wherein a line sensor configured to be installed in a sheet conveyance path and in a direction intersecting the conveyance direction of the sheet performs the detecting.

11. The image processing method according to claim 8,
wherein a line connecting two points located at positions intersecting the conveyance direction of the sheet is further detected from the pattern formed on the sheet, and
wherein, the acquired correction value includes an angle formed between the line connecting the detected two points and a side of the sheet in the main-scanning direction.

12. The image processing method according to claim 8,
wherein a first point from a side of the sheet in the main-scanning direction and a second point from the pattern are further detected, and
wherein the acquired correction value further includes a distance between the side of the sheet in the main-scanning direction and the pattern acquired from a detection result.

13. The image processing method according to claim 8,
wherein at least two points are further detected among points of a side of the sheet in the sub-scanning direction among sides of the sheet, and
wherein the acquired correction value includes an angle with respect to the conveyance direction of the sheet obtained from a detection result.

14. The image processing method according to claim 8,
wherein a first point from a side of the sheet in the sub-scanning direction and a second point from the pattern are further detected, and
wherein the acquired corrected value includes a distance between the side of the sheet in the sub-scanning direction and the pattern obtained from a detection result.

15. A non-transitory computer-readable storage medium storing a program, that when executed causes a computer to execute image processing comprising:
forming, on a sheet, a pattern from which at least a first line and a second line each connecting two points located at positions parallel to a conveyance direction of the sheet are detectable;
detecting, from the formed pattern, lengths of the first and second lines each connecting two points located at positions parallel to the conveyance direction;
acquiring a correction value used when correction is performed so that there is no difference between the lengths of the first and second lines, and
forming an image obtained by correcting a corrected image to be output using the acquired correction value,
wherein the second line is shorter than the first line, the acquired correction value includes a magnification ratio in a sub-scanning direction to increase the length of the second line, and the magnification ratio differs depending on a position in the sheet with respect to a main-scanning direction of the sheet.

* * * * *